Dec. 28, 1965 SHOICHIRO TOYODA ET AL 3,226,013
ROTARY MACHINE
Filed April 28, 1965 14 Sheets-Sheet 1

Shoichiro Toyoda and
Shigeru Sakakibara
Inventors

By Wenderoth, Lind and Ponack
Attorneys

Dec. 28, 1965   SHOICHIRO TOYODA ET AL   3,226,013
ROTARY MACHINE
Filed April 28, 1965   14 Sheets-Sheet 6

Dec. 28, 1965    SHOICHIRO TOYODA ET AL    3,226,013
ROTARY MACHINE
Filed April 28, 1965                        14 Sheets-Sheet 10

Dec. 28, 1965  SHOICHIRO TOYODA ET AL  3,226,013
ROTARY MACHINE
Filed April 28, 1965  14 Sheets-Sheet 12

Dec. 28, 1965  SHOICHIRO TOYODA ET AL  3,226,013
ROTARY MACHINE

Filed April 28, 1965  14 Sheets-Sheet 13

United States Patent Office 3,226,013
Patented Dec. 28, 1965

3,226,013
ROTARY MACHINE
Shoichiro Toyoda, Nagoya, and Shigeru Sakakibara, Chita-gun, Japan, assignors to Toyota Motor Company Limited, and Aichi Kogyo Kabushiki-kaisha, Toyota, Japan
Filed Apr. 28, 1965, Ser. No. 451,592
Claims priority, application Japan, May 4, 1964, 39/25,191
22 Claims. (Cl. 230—145)

The invention relates to improvements in a rotary machine of the type comprising a housing member including therein a plurality of operating chambers for compressing a fluid introduced therein, a rotor member disposed in the interior of the housing to define the plurality of chamber with the housing and capable of being driven eccentrically to the central axis of the interior of the housing, the housing and rotor members having an internal and an external cross-sectional profile respectively determined on the basis of an $n$-ple epitrochoidal curve, and an apex seal structure disposed between each pair of adjacent chambers to hermetically seal one chamber from the other. Such rotary machines involve rotary pumps, rotary compressors, internal combustion engines of rotary type, oil rotary engines, air rotary engines etc.

In the rotary machines of the type above described it has been already known to utilize any epitrochoidal curve actually or theoretically known or conceivable, to determine the shape or configuration of a housing and a rotor. For example, the housing may have its internal configuration following a curve substantially parallel to any multi-lobed epitrochoidal curve while the configuration of a rotor is determined according to an inner envelope formed of the substantially parallel curves. Simultaneous revolution and rotation of the rotor relative to the housing is utilized to vary volumes of operating chambers confined by the surfaces of the rotor and the housing. Then this variation in volume of the operating chambers is utilized to produce a motive power or to perform a work. Alternatively the housing may have its internal configuration determined by an outer envelope formed of the substantially parallel curves as above described and the rotor having its configuration determined by the substantially parallel curve is rotatably disposed in the interior of the housing. Due to the various families of epitrochoidal curves having one, two, three or more lobes and curves substantially parallel thereto, a wide variety of rotary machines such as rotary pumps and rotary type internal combustion engines can be designed and constructed.

However, one of the difficult problems always encountered in designing and constructing the rotary machines of the type above described is to ensure perfect maintenance of seal between the rotor and those portions of the internal surface of the housing contacting the same. As well known, an apex seal and a side seal must be effected and the former is far more important than the latter in view of the performance standpoint. However, the apex seal is extremely difficult to be maintained. Various attempts have been previously proposed to solve this apex seal problem. Typically at least one spring loaded seal element in the form of a rectangular thin strip could be placed in a longitudinal groove disposed at each of the vertices or apices of the curved surface of either the rotor or the interior of the housing whose cross-sectional profile follows an inner or outer envelope formed of curves substantially parallel to an epitrochoidal curve used as the basic curve and be resiliently pressed against the surface of the interior of housing or the rotor as the case may be. Such seal element may have its extremity made in an arc shape or a needle roller rotatably secured to the extremity.

This measure appears to ensure a desired apex seal between the relatively rotating parts because such seal element can effectively follow the mating surface even in the presence of the surface irregularities caused from various factors apparent to those skilled in the art. However, in operation, the apex seal element may exhibit the fluttering or chattering effect damaging and wearing both the same and the mating surface. The chattering effect results from the various factors such as a variation in frictional resistance due to insufficient lubrication of the operating surface particularly in case of the internal combustion engines and/or to a change in biasing force for the seal element occurring upon the latter effecting the automatic correction movement, a variation in contacting angle between the seal element and the adjacent portion of the mating surface accompanied by a change in effective contact pressure exerting on them, a local variation in relative speed, a variation in centrifugal force in certain cases and the like. It will be readily understood that the chattering effect can progressively damage the operating surfaces during long service with the result that the required apex seal between the relatively moving parts becomes extremely difficult to be retained leading to a decrease in performance of the associated machine.

The difficulty with which such apex seal can be retained will be readily appreciated from the fact that a piston ring used in a reciprocating internal combustion engine is apt to chatter although the same is sufficiently oiled and effects rectilinearly sliding movement. It is well known that the use of a plurality of piston rings ensures the seal maintenance and durability. However, if a plurality of apex seal elements are used for each apex in the conventional type of rotary machines then only a single seal element can be theoretically prevented from reciprocating while the remaining elements effect forcedly reciprocating movement whose amplitude may reach the order of 2 mm. This causes the chattering effect in a high speed operation.

Accordingly, it is a general object of the invention to eliminate the above mentioned difficulties of and objections to the conventional rotary machines.

It is the primary object of the invention to provide a rotary machine having an improved construction ensuring that apex seal between the respective surfaces of a rotor and an operating chamber is effectively maintained for a long period of time as well as facilitating oiling to the apex seal portion.

It is another object of the invention to provide a new and improved rotary machine comprising an apex seal structure having a large contact area thereby to have a high performance over a wide range of from the low speed operation to the high speed operation.

It is a further object of the invention to provide a rotary machine including an improved apex seal structure put on at least two lines in line contact with the associated surface of a rotor or an interior of a housing thereby to be prevented from chattering.

It is a still further object of the invention to provide a rotary machine including an improved apex seal structure reliable in operation, permitting a lubricant to be easily supplied to the seal structure and to be consumed in a proper amount and improving the wear resisting property of the machine.

It is another object of the invention to provide an improved rotary machine durable and high in efficiency.

With the aforesaid objects in view, the invention resides in a rotary machine of the type comprising a housing member including therein a plurality of operating chambers for compressing a fluid introduced therein, a rotor member disposed in the interior of the housing member to define the plurality of operating chambers and capable of being driven eccentrically to the central axis of the interior of the housing, the housing and rotor members having an internal and an external cross-sectional profile respectively determined on the basis of an $n$-ple epitrochoidal curve, and an apex seal structure disposed between each pair of adjacent operating chambers to hermetically seal one chamber from the other. It is characterized in that the apex seal structure having a profile based upon an isosceles triangle substantially smaller in dimension than the radius rector of the $n$-ple lobed epitrochoidal curve utilized and includes at least a pair of longitudinal ridge portions, and that one of the housing and rotor members has an internal or external cross-sectional profile following a curve prepared by moving an isosceles triangle identical to the first-mentioned isosceles triangle for the seal structure along the epitrochoidal curve in such a manner that two vertices for the base of the moving triangle move on a modified curve spaced substantially in parallel outwardly or inwardly from the epitrochoidal curve a predetermined minute length while the remaining vertex depicts the epitrochoidal curve to determine the modified curve and parallel displacing all points on the modified curve outwardly or inwardly by a common length equal to a distance between the extremity of the ridge portion of the seal structure and the base of the triangle for the latter while the other member has an external or an internal cross-sectional profile following an internal or an external envelope formed of the parallel curves determining the profile of the one member, the apex seal means being disposed at each apex of that surface of the member determined by the envelope so as to contact the ridge portions with the other surface of the member.

Preferably the apex seal structure may be spring loaded and resiliently mounted at the surface apex for rocking movement about the vertex formed of two equal sides of the isosceles triangle for the same.

The invention as to its organization and the manner of operation as well as the other objects and advantages thereof will become more readily apparent from the following detailed description taken in conjunction with the accompanying drawings in which.

Before the invention will be in detail described a family of epitrochoidal curves and innner and outer envelopes therefor will be mathematically described because the mathematical concept of these curves is required to be known in order to better understand the invention.

Using the Cartesian orthogonal coordinate system, any epitrochoidal curve may be expressed by the following general equations:

(1) $\quad x_n = a_n \cos(n+1)\theta + b_n \cos\theta$
(2) $\quad y_n = a_n \sin(n+1)\theta + b_n \sin\theta$ where $x_n$ and $y_n$ are the abscissa and ordinate of any point on the curve, $a_n$ and $b_n$ represent positive constants, $n$ is any integer and $\theta$ is variable between 0 and $2\pi$ radians measured from the $x$ axis in the counterclockwise direction. If $n$ has a value of 1, 2, 3, 4, . . . then the resulting epitrochoidal curve will have one, two, three, four, . . . lobes respectively. Also the shape of the curve depends upon a ratio of $a_n : b_n$.

Figure 1:
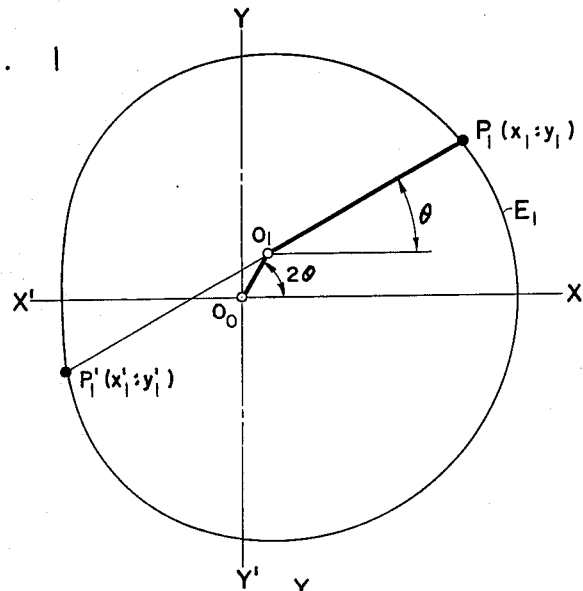
FIGS. 1 through 3 show certain multi-lobed epitrochoidal curves on the basis of which cross-sectional profiles of a rotor and an interior of a housing can be determined in accordance with the teachings of the invention.
Figure 2:
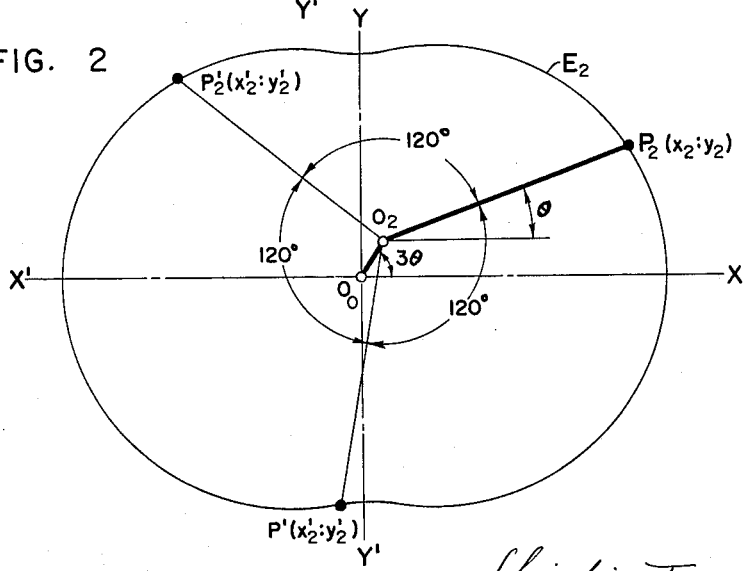
Figure 3:
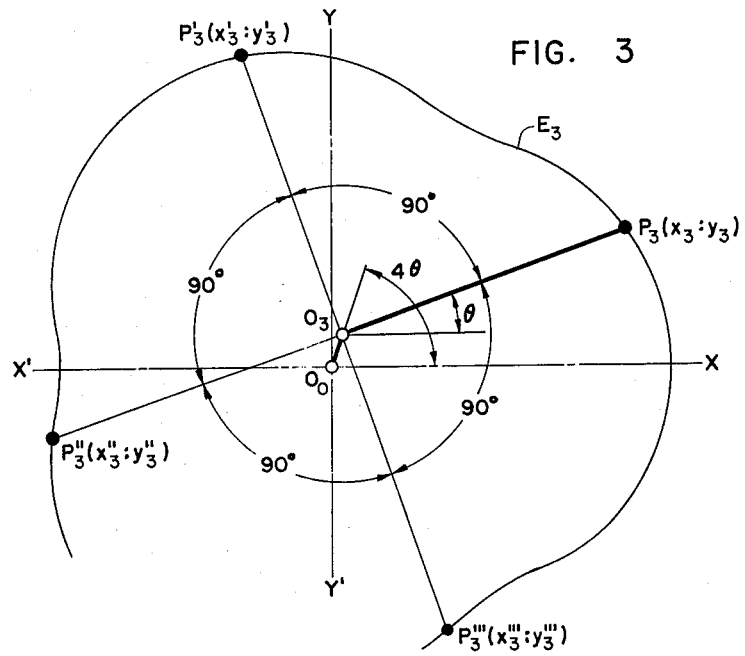

Referring now to FIGS. 1 through 3, there are illustrated certain epitrochoidal curves with respect to the Cartesian orthogonal coordinate system. In FIG. 1 it is assumed that a first radius vector $\overline{O_0O_1}$ having a constant length of $a_1$ is rotated about the origin $O_0$ of the $x-y$ orthogonal coordinate system in the counterclockwise direction as viewed in FIG. 1. It is also assumed that a second radius vector $\overline{O_1P_1}$ having a constant length of $b_1$ is rotated in the same direction as the first radius vector about the end point $O_1$ of the latter with a ratio of number of rotation of the first vector $\overline{O_0O_1}$ to that of the second vector $\overline{O_1P_1}$ having a value of 2:1. Then it will be seen that the end point $P_1$ ($x_1$, $y_1$) of the second vector whose coordinates are $x_1$ and $y_1$ depicts a locus represented by a curve illustrated in FIG. 1. The curve is expressed by the equations (3) $\quad x_1 = a_1 \cos 2\theta + b_1 \cos\theta$ and (4) $\quad y_1 = a_1 \sin 2\theta + b_1 \sin\theta$ The ratio of $a_1 : b_1$ for the illustrated curve is equal to 1:4.5. The equations 3 and 4 are obtained by substituting 1 for $n$ in the general Equations 1 and 2.

In other words, if a first radial arm having a length of $a_1$ is rotated about its one end and simultaneously a second radial arm having a length of $b_1$ is rotated about the junction of both arms in the same direction as and at a rate equal to twice the rate of the first arm then the free end of the second arm moves on an epitrochoidal curve such as illustrated in FIG. 1.

Since the second radius vector $\overline{O_0P_1}$ effects one complete revolution about the end point $O_1$ thereof during two complete rotations of the first vector $\overline{O_0O_1}$ about the origin $O_0$, two points diametrically opposed to each other lie on the curve for any given value of $\theta$. For example, if the first radius vector $\overline{O_0O_1}$ is in its position illustrated in FIG. 1, the second radius vector may assume either of two positions designated at solid line $O_1P_1$ and thin line $O_1P'_1$ equal in length and opposite in direction to the solid line $O_1P_1$ with both end points $P_1$ and $P'_1$ lying on the same epitrochoidal curve. This can be readily proved by substituting $\pi + \theta$ for $\theta$ in the Equations 3 and 4.

The curve illustrated in FIG. 1 is recessed near $\theta = \pi$ radians and hence may be called a single lobed epitrochoidal curve.

From the foregoing it will be appreciated that if two straight rods having a common length of $b_1$ and rigidly connected together at one end at an angular interval of $\pi$ radians or 180 degrees effects rotation about their junction point such as the point $O_1$ located a distance of $a_1$ from the origin $O_0$ and simultaneously revolution about the origin $O_0$ in the direction of rotation with two complete revolutions effected during one complete rotation that both ends of the connected rods depict a common single lobed epitrochoidal curve such as shown in FIG. 1.

FIG. 2 shows an epitrochoidal curve obtained when the value of $n$ in the general Equations 1 and 2 is 2 with a ratio of $a_n:b_n$ equal to 1:6.5. That curve is expressed by the equations (5) $\qquad x_2 = a_2 \cos 3\theta + \cos \theta$ and (6) $\qquad y_2 = a_2 \sin 3\theta + \sin \theta$ As in FIG. 1, a first radius vector $\overline{O_0O_1}$ having a constant length of $a_2$ is rotated about its one end or the origin $O_0$ in the counterclockwise direction while a second radius vector $\overline{O_1P_2}$ having a constant length of $b_2$ is rotated about the end point $O_2$ in the same direction as the first vector with the number of rotation of the first vector maintained equal to twice that of the second vector. Then the free end $P_2$ of the second vector will depict a curve such as shown in FIG. 2. Thus the second vector effects one complete rotation about the end point $O_1$ of the first vector during three complete rotations of the latter with the result that three points such as $P_2$, $P'_2$ and $P''_2$ disposed from each other at angular intervals equal to $\tfrac{2}{3}\pi$ radians or 120 degrees lie on the curve for any given angle of $\theta$. As shown in FIG. 2 and apparent from the Equations 5 and 6, a distance of any point on the curve from the origin $O_0$ becomes minimum at two positions separated away from each other by an angular interval of 180 degrees. Thus the curve illustrated in FIG. 2 may be called a double lobed epitrochoidal curve.

As in FIG. 1, it will be appreciated that, if three rods having a common length of $b_2$ and rigidly connected together at one end located a distance $a_2$ from a predetermined point such as the origin $O_0$ at angularly equal intervals equal to 120 degrees or $\tfrac{2}{3}\pi$ radians effect rotation about that one end in one direction while the connected rods as a whole are revolved about the origin in the one direction at three times the number of rotation of the rods, that the free ends of the rods depict a common double lobed epitrochoidal curve.

FIG. 3 is a fragmental view of triple lobed epitrochoidal curve expressed by the equations (7) $\qquad x_3 = a_3 \cos 4\theta + \cos \theta$ and (8) $\qquad y_3 \sin 4\theta + \sin \theta$ with a ratio of $a_3:b_3$ equal to 1:8.6. When 3 is substituted for $n$ in the general Equations 1 and 2 the Equations 7 and 8 are deduced.

In view of the foregoing description for FIGS. 1 and 2 it will be readily understood that when <u>four rods</u> (which may be designated by vectors $\overline{O_3P_3}$, $\overline{O_3P'_3}$, $\overline{O_3P''_3}$ and $\overline{O_3P'''_3}$ in FIG. 3) having a common length of $b_3$ and rigidly connected together at one end located a distance of $a_3$ from the predetermined point such as the origin $O_0$ and at angularly equal intervals of $\pi/2$ radians or 90 degrees effect rotation about at that one end in one direction while connected rods as a whole effect revolution about the predetermined point or the origin at four times the number rotation of and in the same direction as the rods, that the free ends of the rods depict a common quadruple epitrochoidal curve.

From the foregoing it will be appreciated that when $(n+1)$ straight rods having a common length of $b_n$ and rigidly connected together at one end located a distance of $a_n$ from a predetermined point such as the origin of the coordinate system involved at angularly equal intervals of $\pi/n$ radians effect rotation about the one end in one direction while the connected rods as a whole effect revolution about the predetermined point at $(n+1)$ times the number of rotation of and in the same direction as the rods that the free ends of the rods depict a common $n$-ple lobed epitrochoidal curve expressed by the general Equations 1 and 2.

The principle of the invention is based upon the fact that an ideal set of a plurality of rods equal in length, rigidly connected in the manner as above described and having its free ends adapted to move on an $n$-ple epitrochoidal curve such as previously described is provided at each of the free ends with an isosceles triangle pivotably mounted thereat for rocking movement about a vertex formed of the equal sides of the isosceles triangle and to cause the vertices for the base of the triangle to slide along a curve derived from the $n$-ple epitrochoidal curve involved in a manner as will be described hereinafter without the latter vertices separated away from the derived curve. The derived curve may be referred to hereinafter as a "modified curve." The manner in which the modified curve is derived from the corresponding $n$-ple epitrochoidal curve will subsequently be described in conjunction with FIGS. 4 through 9.

FIGS. 4 through 9 illustrate certain modified curves for the epitrochoidal curves shown in FIGS. 1 through 3 useful in practicing the invention.

Figure 4:
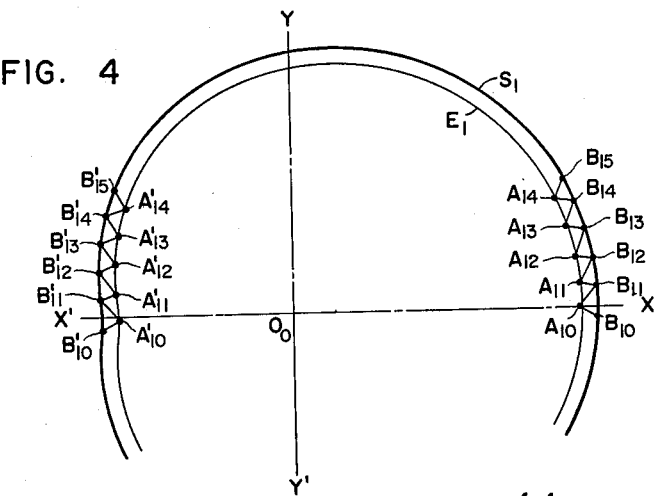
FIGS. 4 through 9 show the manner in which a curve can be drawn for use in defining the cross-sectional profile of the rotor or the interior of the housing on the basis of a multi-lobed epitrochoidal curve as illustrated in FIGS. 1, 2 or 3 and according to the teachings of the invention.

In FIG. 4 an epitrochoidal curve $E_1$ corresponds to the curve illustrated in FIG. 1. Since the curve $E_1$ is symmetrical with respect to the $x$ axis only that portion thereof located on and above the $x$ axis will be considered.

It is assumed that a small isosceles triangle $\Delta A_{10}B_{10}B_{11}$ of predetermined dimension is disposed on the curve $E_1$ such that the vertex formed by two equal sides of the same is located at the intersection of the curve with the $x$ axis on the positive side thereof and outside the curve while the base is maintained substantially perpendicular to the $x$ axis. Then a pair of vertices at both ends of the base will have the definite magnitudes of coordinates with respect to the Cartesion orthogonal coordinate system involved.

Then the triangle $\Delta A_{10}B_{10}B_{11}$ is successively transferred to positions $A_{11}B_{11}B_{12}$, $A_{12}B_{12}B_{13}$, $A_{13}B_{13}B_{14}$, $A_{14}B_{14}B_{15}$ . . . such that the vertex is moved on the curve $E_1$ while for each transfer movement one end of the base assumes its position at which the other end of the base was located before the transfer movement. For example, after a first transfer movement the vertex $A_{10}$ has been moved to its position $A_{11}$ and the vertex $B_{10}$ at one end of the base has been moved to the position $B_{11}$ at which the vertex at the other end of the base was located before the transfer movement.

As to another isosceles triangle $\Delta A'_{10}B'_{10}B'_{11}$ identical to the triangle $\Delta A_{10}B_{10}B_{11}$ and disposed at the intersection of the curve $E$ and the $x$ axis on the negative side thereof in the same manner as the latter triangle, the procedure as above described can be repeated. Then a broken line consisting of the segments $\overline{B_{10}B_{11}}$, $\overline{B_{11}B_{12}}$, . . . or $\overline{B'_{10}B'_{11}}$, $\overline{B'_{11}B'_{12}}$ . . . of the isosceles triangle is formed outside the curve $E_1$ throughout the length of the upper half portions. The broken line can be smoothed in the conventional manner. The smooth curve is designated by the reference character $S_1$ in FIG. 4 and may be called an "outer modified curve" for a single lobed epitrochoidal curve.

With the base of the isosceles triangle relatively short, it is possible that when the vertex formed by two equal sides is located in any position intermediate a pair of adjacent points such as $A_{10}$ and $A_{11}$, $A_{11}$ and $A_{12}$, . . . , on the curve $E$ with one vertex for the base positioned on the curve $S_1$ that the other vertex for the base is positioned on or adjacent the curve $S_1$ within an error allowable for the practical purposes, for example, within 3 microns.

In forming the curve $S_1$ it is to be noted that each of the equal sides of the isosceles triangle should have a length equal to at most the length of $b_1$ as previously described divided by a factor of 20 or more. Alternatively, the epitrochoidal curve should have a large radius of curvature by using the second radius vector as long as possible compared with a first radius vector.

Since the epitrochoidal curve $E_1$ is symmetrical with respect to the $x$ axis as previously pointed out, a mirror image of the curve $S_1$ will provide the corresponding curve for the portion of the curve $E_1$ positioned below the $x$ axis. Thus the outer modified curve for the single lobed epitrochoidal curve has been formed for use with the invention in the manner as will be described hereinafter.

The outer modified curve $S_1$ may be also explained such that when an isosceles triangle identical to that previously described is transferred along the curve $S_1$ with both vertices for the base always located on the curve that the vertex formed by two equal sides depicts the same single lobed epitrochoidal curve $E_1$ as shown in FIG. 4.

Figure 5:
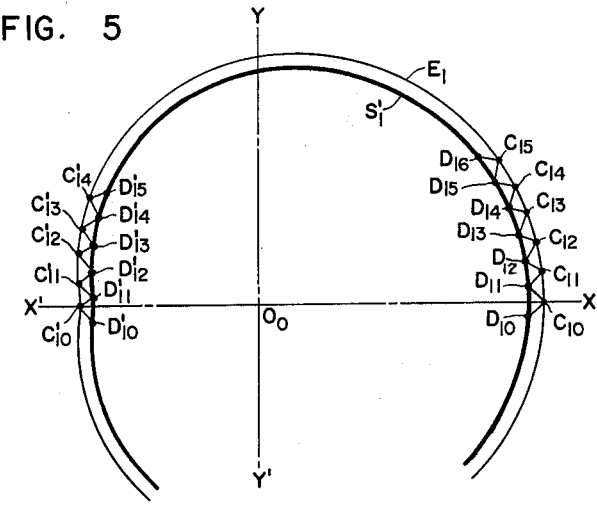

If an isosceles triangle similar or identical to that previously described for FIG. 4 is transferred along the single lobed epitrochoidal curve on inside thereof, in the same manner as in FIG. 4 another modified curve will be formed. This curve may be called an "inner modified curve" for a single lobed epitrochoidal curve and is designated by the reference character $S'_1$ in FIG. 5. In FIG. 5 the corresponding points or triangles are designated by the reference characters C and D with the same suffixed digits as in FIG. 4 and therefore a description need not be made.

It will be understood that for an epitrochoidal curve having more than one of lobes, an outer and an inner modified curve can be formed in the similar manner to that previously described in conjunction with FIG. 4.

Figure 6:
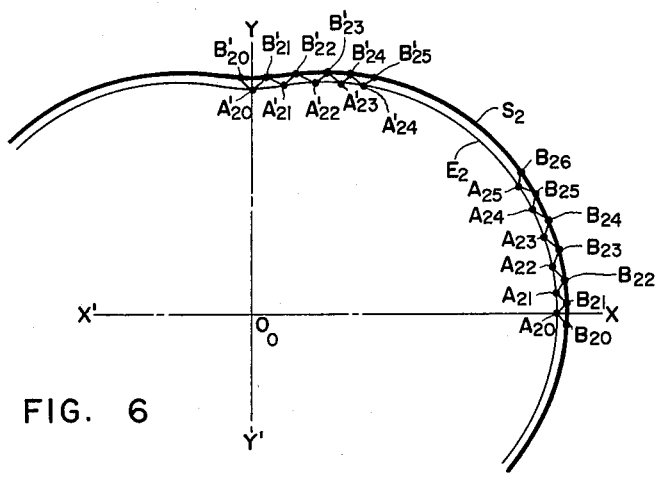
Figure 7:
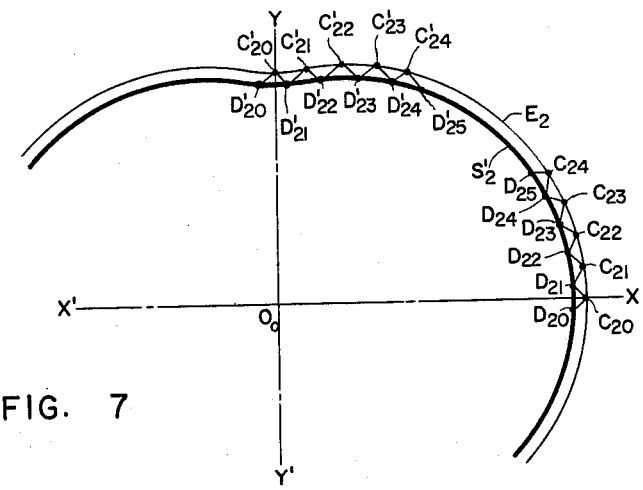

Since a double lobed epitrochoidal curve is symmetrical with respect to both $x$ and $y$ axes, the procedure as previously described is required to be repeated in one quadrant, for example, a first quadrant thereof as shown in FIGS. 6 and 7.

In FIG. 6, the double lobed epitrochoidal curve identical to that illustrated in FIG. 2 is designated by the reference character $E_2$ and the resulting outer modified curve designated by the reference character $S_2$. Also the points or triangles corresponding to those illustrated in FIG. 4 are designated by the same reference characters suffixed with the same last digits.

In FIG. 7, the reference character $E_2$ designates the same double-lobed epitrochoidal curve as in FIG. 6 and the reference character $S'_2$ designates the resulting inner modified curve. Also the points or triangles corresponding to those illustrated in FIG. 5 are designated by the same reference characters suffixed with the same last digits.

Thus FIGS. 6 and 7 need not be further described.

Figure 8:
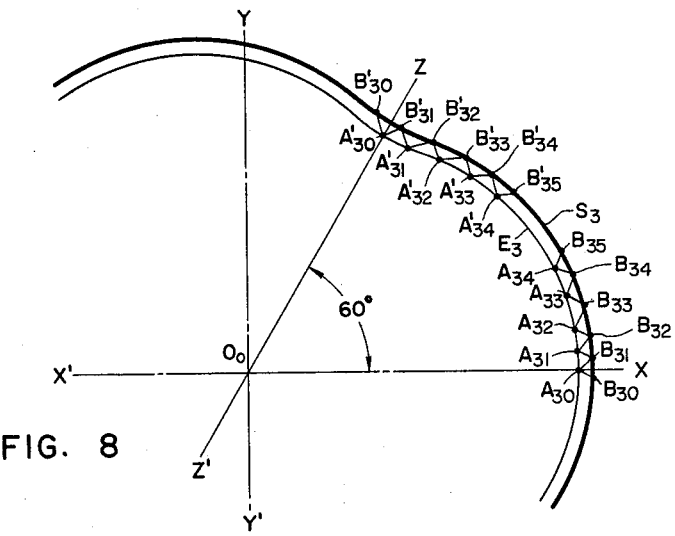
Figure 9:
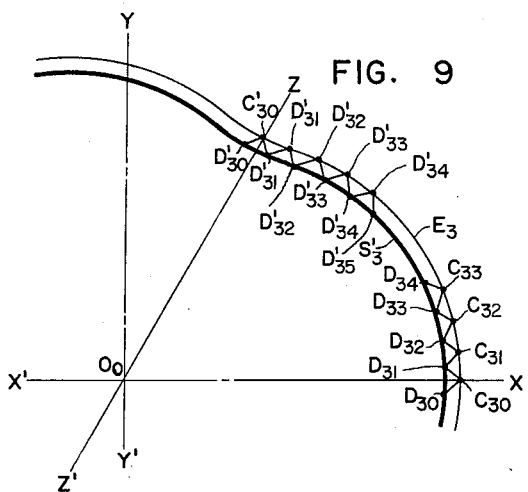

FIGS. 8 and 9 illustrate outer and inner modified curves $S_3$ and $S'_3$ respectively for triple lobed epitrochoidal curve $E_3$ as shown in FIG. 3. As the triple lobed epitrochoidal curve has three lines of symmetry of rotation, the procedures as previously described for FIG. 4 is required to be repeated over an angular range of 60 degrees as shown in FIGS. 8 and 9. The points or triangles corresponding to those in FIGS. 4 and 5 respectively are designated by the same reference characters suffixed with the same last digits.

From the foregoing it will be appreciated that for any given $n$-ple epitrochoidal curve an outer and an inner modified curve can be formed in the similar manner as previously described in conjunction with FIG. 4.

From the foregoing it will be also apparent that a process of graphically preparing from a given epitrochoidal curve the corresponding inner and outer modified curves has been provided in a very practical manner. On the other hand, if a modified curve is preliminarily given by a suitably presumed equation then the parameters for the corresponding epitrochoidal curve and the dimension of an isosceles triangle to be moved along the latter curve may be numerically calculated. Further by utilizing partially the latter process in conjunction with the process previously described for FIGS. 4 through 9, an epitrochoidal curve, the dimension of such an isosceles triangle and the corresponding modified curves may be simultaneously determined. Also a modified curve for an epitrochoidal curve may be, as a whole, expressed by the mathematical equation or equations or in terms of figures deviated from the epitrochoidal curve. Therefore, it is to be understood that the invention is not limited to both the particular process of determining such modified curve and the particular manner to express the latter.

The invention will now be described in conjunction with various preferred embodiments thereof utilizing a modified curve for a selected epitrochoidal curve, an ideal set of connected rods and an isosceles triangle pivotably mounted at each of the free ends of the rods. It is to be noted that as the invention is primarily directed to the profiles of an interior of a housing and a rotor rotatably disposed in the interior of the housing and an apex seal structure for hermetically sealing each pair of operating chambers confined by the rotor and the internal surface of the housing, the rotor, the housing and the seal structure may be of any suitable materials well known in the art. Therefore, such materials need not be described.

Figure 10:
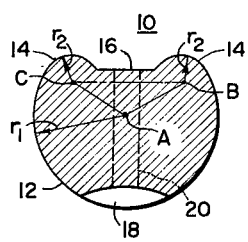
FIG. 10 shows a fundamental cross-sectional profile in enlarged size of an apex seal element constructed in accordance with the teachings of the invention.

Referring now to FIG. 10, there is illustrated in cross-section a typical form of an apex seal element constructed in accordance with the teachings of the invention. The apex seal element illustrated is designed and constructed on the basis of an isosceles triangle $\triangle ABC$ identical in dimension to one suitable to be mounted at a free end of an ideal connecting rod such as the rod previously described in conjunction with FIGS. 1 through 3. The seal element generally designated by the reference numeral 10 includes a major arc portion 12 having a radius of $r_1$ and a center at a vertex A formed of the two equal sides of the isosceles triangle $\triangle ABC$ and a pair of spaced minor arm portions 14 each having a radius of $r_2$ and a center at a vertex B or C at the either end of the base of the triangle.

The minor arc portions 14 are connected at the adjacent ends to each other by a recessed surface portion 16 and merging at the other ends into the adjacent portions of the major arc portion 12 respectively to provide a pair of longitudinal ridge portions adapted to contact and slide along an internal or external surface respectively of a housing or rotor involved. That is, the seal element is adapted to contact on two lines in contact with the mating surface. Therefore, the seal element 10 may be referred to hereinafter as a double contact seal element.

The major arc portion 12 serves to provide an engaging part pivotably held in a compensating holder as will be described hereinafter for the purpose of permitting the sealing element to rock about the vertex A of the triangle with respect to the rod as previously described. As shown in FIG. 10, the major arc portion 12 may be provided on the middle portion diametrically opposed to the connecting portion 16 with a notch 18 and has axially formed therein a through bore 20 designated at two parallel dotted lines. The notch 18 and the bore 20 are provided for oiling purposes. If desired, more than one of the bores may be disposed extending in parallel relationship through the body of the seal element. Also the notch may, if desired, be changed in shape and position to serve to supply a lubricant to the operating surface of the seal element intermittently in accordance with the position of the rocking element as will be described hereinafter.

Other forms of the seal elements will hereinafter be described in more detail in conjunction with FIGS. 25 through 29.

It will be recalled that an ideal set of $(n+1)$ rods rigidly connected at one common end at angularly equal intervals is rotated about that common end while the latter is revolved about a predetermined point different from the common end at $n$ times the number of rotation of and in the same direction as the rods that the other ends of the rods depict a common locus providing an $n$-ple epitrochoidal curve. For this *n*-ple lobed epitrochoidal curve a physical shape or configuration of the set of $(n+1)$ rods disposed as above described will now be described.

It is assumed that the double contact seal element as illustrated in FIG. 10 is incorporated into any embodiment of the invention as will be described hereinafter. Therefore, an isosceles triangle identical to the isoceles triangle $\triangle ABC$ as illustrated in FIG. 10 is used to modify any given *n*-ple lobed epitrochoidal curve. The modified curve is uniformly expanded or contracted by a radial length equal to the radius $r_2$ of the minor arc portion 14 of the seal element 10 to provide a curve which may be referred to hereinafter as a "parallel curve" to the modified curve. In other words, all points on the modified curve is displaced uniformly and outwardly or inwardly of the curve to provide the parallel curve.

If the parallel curve thus obtained is rotated so as to effect one complete rotation about the origin of the corresponding *n*-ple epitrochoidal curve in one direction per *n* complete revolutions about points eccentric to the origin by a distance equal in magnitude to the constant $a_n$ in the general Equations 1 and 2 and in the opposite direction then the moving parallel curves will form an envelope on each of the inside and outside thereof. The envelope formed on inside of the curve group is an inner envelope and the envelope disposed on the outside is an outer envelope. Certain examples of the envelopes are illustrated in FIGS. 11 through 16 which will be in more detail described hereinafter.

The resulting envelopes each include $(n+1)$ apices or nodal points disposed at angularly equal intervals and equidistant from the center of rotation with any pair of adjacent apices connected by an arc-shaped curve. Each of the free ends of the above-mentioned rod set is positioned within the associated apices on the inner envelope a certain distance while the same positioned outside the associated apices on the outer envelope a certain distance. In this connection, it is to be noted that with the parallel curve to the modified curve numerically given, these certain distances are, of course, determined numerically.

The invention contemplates to adopt those inner and outer envelopes to determine the physical configuration of the set of connecting rods that is, of an internal surface of a housing and an external surface of a rotor respectively. However, it is to be understood that, upon designing and constructing any internal combustion engine of rotary type or any rotary pump in accordance with the teachings of the invention, any of those envelopes per se is not necessarily utilized in view of the standpoints of compression ratio, combustion effect, workability and the like and instead a curve approximating the same may be used.

In the following description, th eterm "set of $(n+1)$ connected rods" is not used and instead a curved surface following the inner envelope as above described is called an "external curved surface" following the inner envelope formed of the parallel curves to the modified curve for the *n*-ple lobed epitrochoidal curve while a curved surface following the outer envelope is called an "internal curved surface" following the other envelope formed of the parallel curves to the modified curve for the *n*-ple lobed epitrochoidal curve.

The invention contemplates to use an internal and an external curved surface just described to determine the configurations or cross-sectional profiles of a rotor and an interior of a housing respectively. Upon practicing the invention, either of the rotor and interior of the housing whose profile follow the inner and outer envelopes respectively is provided on each of the apices with one guide groove extending in parallel to the central axis and radially and having a sealing element such as shown in FIG. 10 and a compensating holder as will be described hereinafter.

Figure 11:
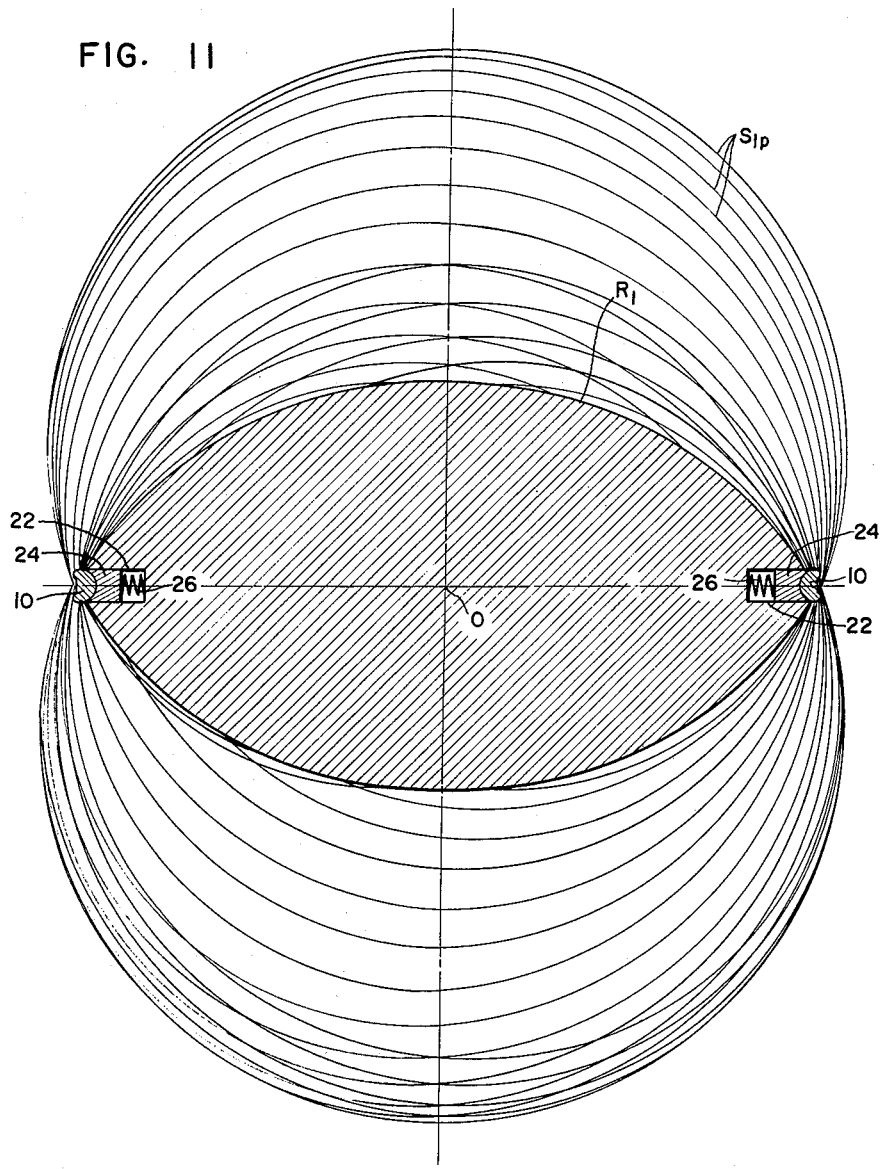

Certain examples of the envelopes as above described are illustrated in FIGS. 11 through 16. In FIG. 11 a modified curve such as shown at $S_1$ in FIG. 4 is drawn in the same manner as described for FIG. 4, based upon a single lobed epitrochoidal curve such as shown at $E_1$ in FIG. 1 and then uniformly expanded in the outward direction by a length equal to a radius $r_2$ of the minor arc portion 14 of the double contact seal element as shown in FIG. 10 to provide a parallel curve $S_{1p}$. The center of parallel curve $S_{1p}$ thus obtained is moved to a point eccentric to the origin O of the coordinate system involved a distance equal in magnitude to the constant $a_1$ in the equations for the single lobed epitrochoidal curve $E_1$ and the curve is rotated about the eccentric point in one direction while the same is revolved about the origin in the opposite direction with one complete revolution effected per each complete rotation. The innumerable curves $S_{1p}$ thus moved will form an inner envelope $R_1$ by which an external surface of a rotor can be determined. The envelope $R_1$ is provided for $n=1$ in the general equations representative of an *n*-ple lobed epitrochoidal curve. As shown in FIG. 11 the envelope is formed of two arc-shaped portions and two apices disposed at two diametrically opposed ends. FIG. 11 also shows a radial groove 22 disposed on each apex so as to extend in parallel to the central axis and having disposed therein a two contact seal element 10, a compensating holder 24 for pivotably holding the associated element and a compression spring 26 tending to force the element and the holder outwardly.

Figure 12:
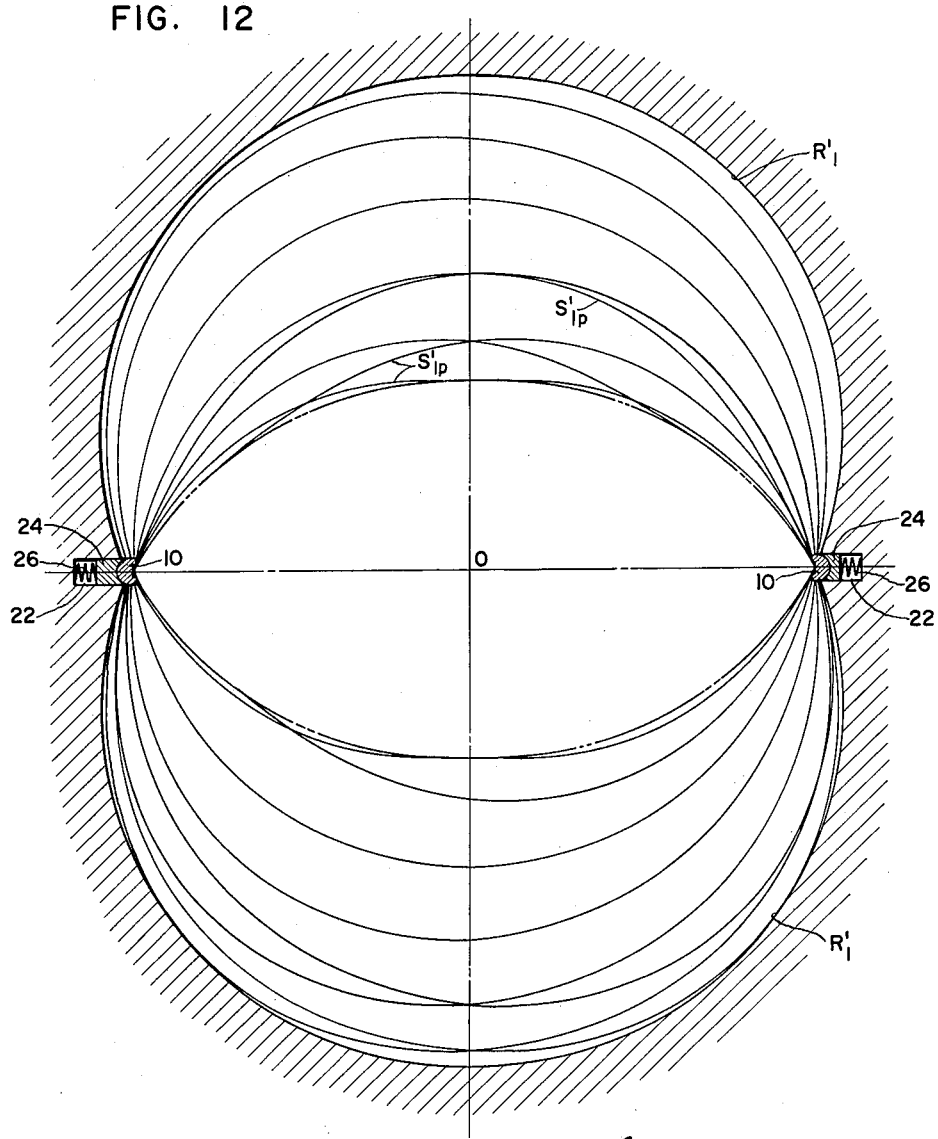

FIG. 12 shows an outer envelope prepared in the same manner as above described in conjunction with FIG. 11 excepting that a modified curve is uniformly contracted in the inward direction to provide a parallel curve $S'_{1p}$. The outer envelope $R'_1$ can be utilized to determine an internal surface of an interior of a housing.

It is noted that as the interior of the housing has its cross-sectional profile following an inner envelope $R'_1$ formed of the parallel curve $S'_{1p}$, an apex seal structure identical to that illustrated in FIG. 11 is disposed on the housing side.

Figure 13:
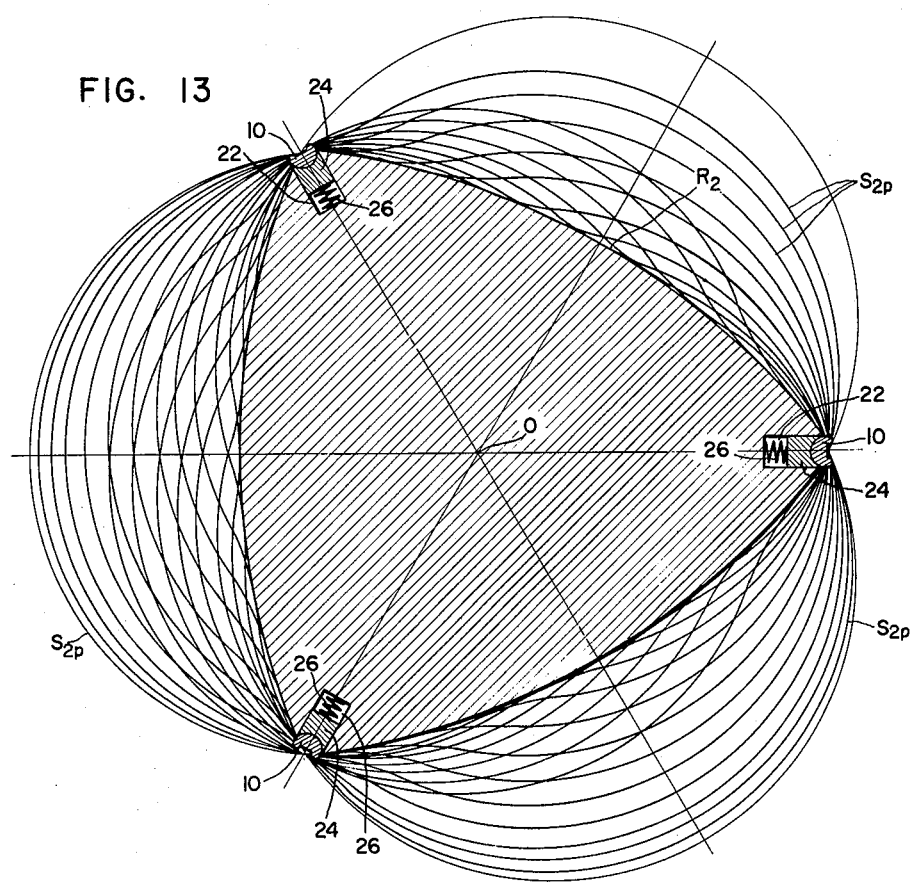
FIGS. 11 through 16 show the manner in which a cross-sectional profile of one of the rotor and the interior of the housing is determined after the cross-sectional profile of the other member has been determined in accordance with the teachings of the invention.
Figure 14:
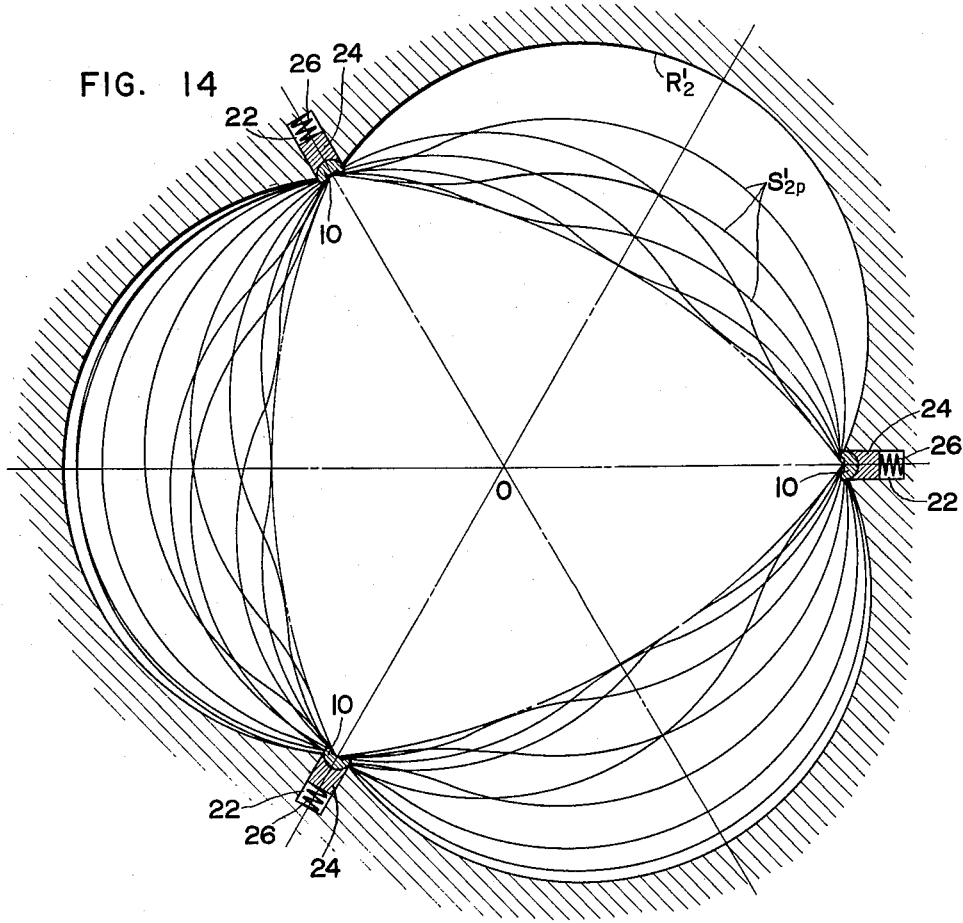

FIGS. 13 and 14 show an inner and an outer envelope $R_2$ and $R'_2$ respectively for a double lobed epitrochoidal curve such as shown in FIG. 2. To obtain such envelope, a parallel curve $S_{2p}$ or $S'_{2p}$ effects one complete rotation in direction during two complete revolutions in the other direction. A spring-loaded seal structure as above described in FIG. 11 is operatively associated with each apex of the rotor or housing and designated by the same reference numerals as in FIG. 11.

Figure 15:
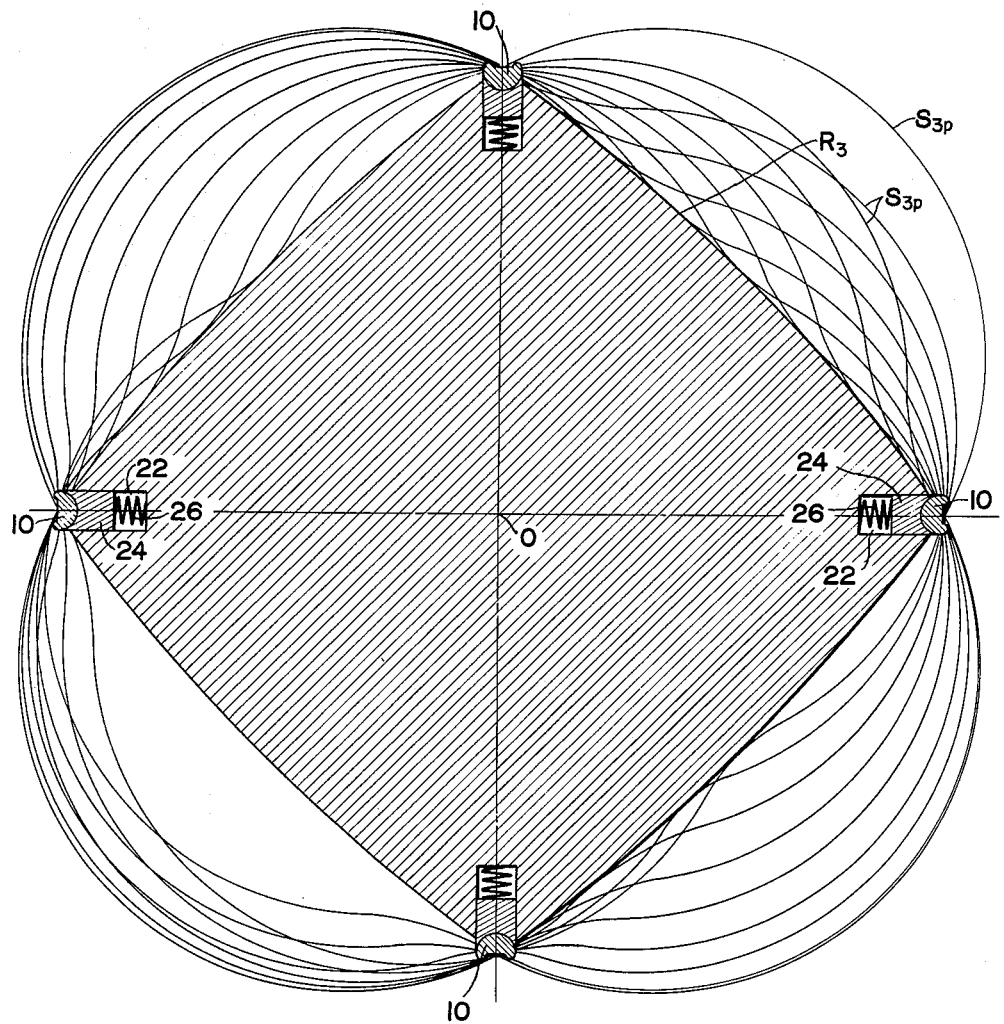
Figure 16:
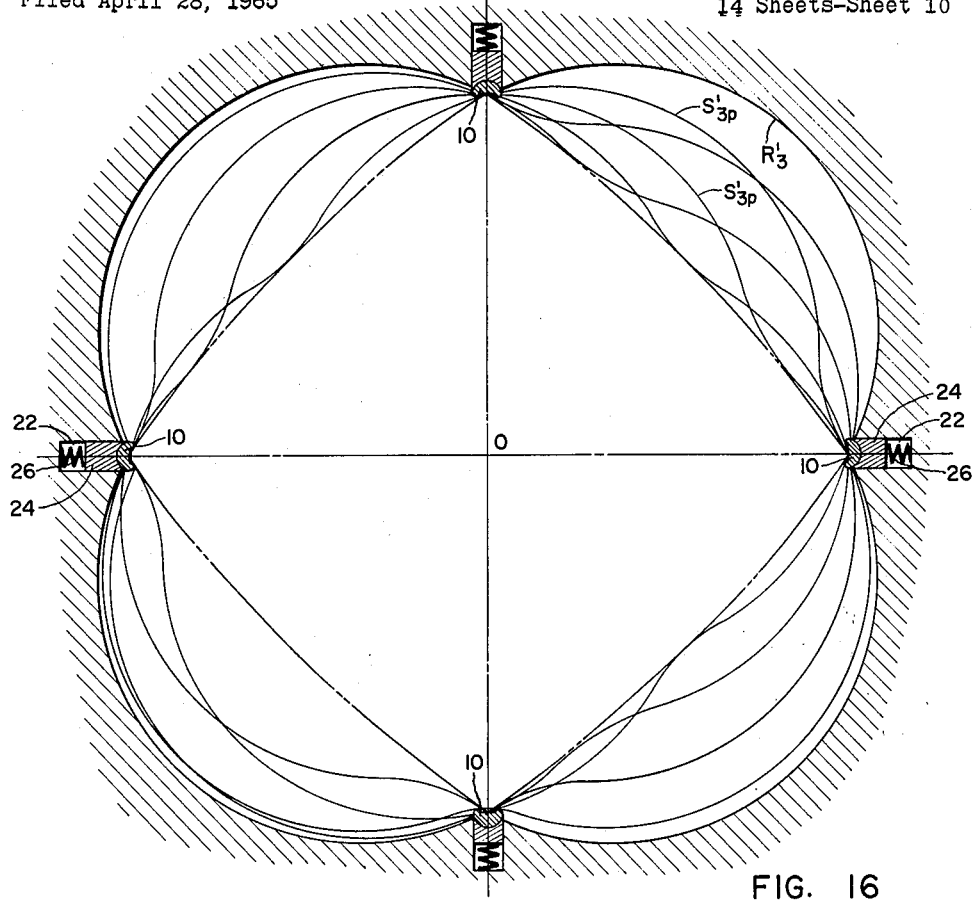

FIGS. 15 and 16 show an inner and an outer envelope $R_3$ and $R'_3$ respectively for a triple-lobed epitrochoidal curve. In these cases it will be readily understood that the parallel curve $S_{3p}$ or $S'_{3p}$ effects one complete rotation in one direction per three complete revolutions in the other direction.

Thus the invention has been described in conjunction with the cross-sectional profiles of the essential components thereof. Certain preferred embodiments of the invention therefore will now be described in terms of internal combustion engines of rotary type and rotary pumps utilizing the envelopes for a single, double and triple lobed epitrochoidal curve only for purpose of illustration. It is to be understood, however, that the envelope for any epitrochoidal curve other than the above-mentioned ones may be utilized, if desired. Also it is to be understood that a seal element identical to that shown in FIG. 10 is resiliently disposed at each apex of an external or internal curved surface respectively of a rotor or housing, as the case may be, in the same manner as previously described in conjunction with FIG. 11 with the same reference numerals as in FIG. 11 used.

Figure 17:
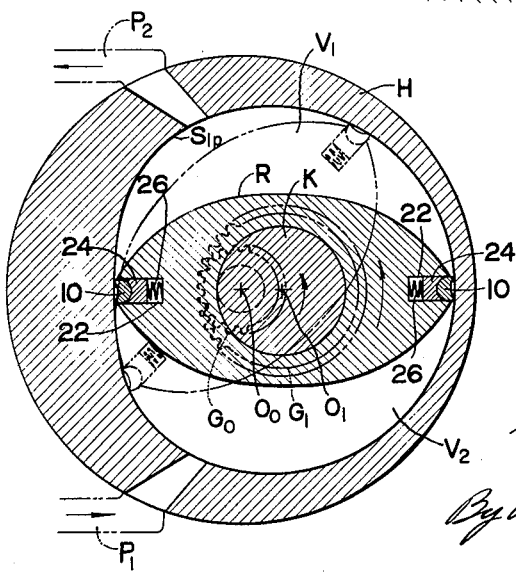
FIGS. 17 through 24 show schematically cross-sections of various rotary machines embodying the teachings of the invention.

Referring now to FIG. 17, there is illustrated a rotary pump of the invention utilizing a single lobed epitrochoidal curve as previously described in conjunction with FIG. 1. An arrangement illustrated comprises a stationary housing H having an internal surface $S_{1p}$ and a rotor R rotatably disposed in the interior of the chamber to divide the interior of the housing into a pair of operating chambers $V_1$ and $V_2$. From a single lobed epitrochoidal curve such as shown at $E_1$ in FIG. 1 an outer modified curve can be prepared in the manner as previously described in FIG. 4. Then the modified curve is uniformly expanded outwardly by a length equal to a radius $r_2$ of a minor arc portion of a two contact sealing element (see FIG. 10) to provide a parallel curve. This parallel curve provides the internal surface of the housing H. Then prepared from the parallel curve is an inner envelope in the manner as previously described for FIG. 11. The rotor R has its cross-sectional profile following the inner envelope thus prepared and including two arc-shaped portions.

In order to drive the rotor eccentrically to the interior of the housing, the rotor R has its axis on the central line $O_0$ of the internal curved surface $S_{1p}$ of the housing H and is mounted on an eccentric shaft (whose axis is designated at $O_1$) of a crank C deviated from the central line $O_0$ by a length equal in magnitude to the constant $a_1$ in the equations for the single lobed epitrochoidal curve utilized. Disposed on the outside of one end wall (not shown) of the housing H is a planetary gearing including an externally toothed gear $G_0$ disposed on the end wall of the housing H on the axis $O_0$ and an internally toothed gear $G_1$ secured on one end wall of the rotor R on the axis $O_1$ and meshing the gear $G_0$ with a gear ratio of 1:2 for the purpose of effecting two complete revolutions of the rotor along with the crank during one complete rotation thereof in the same direction.

As previously noted, an apex seal structure 10, 24, 26 as described in conjunction with FIG. 11 are resiliently disposed in a longitudinal groove 22 formed at each apex of the rotor surface.

In operation a pair of minor arc portions or longitudinal ridge portion 14 (see FIG. 10) of the double contact seal element 10 always contact resiliently the internal curved surface of the housing H and slide along the surface while rocking about the point A (see FIG. 10). Therefore it will be appreciated that the center of the seal element or the center for the major arc having its radius of $r_1$ is normally moved along an imaginary curve which is theoretically the basic curve or the single lobed epitrochoidal curve upon which the internal surface of the housing is determined. Thus it will be understood that so far as the rotor R and the internal surface $S_{1p}$ of the housing are substantially free from any thermal strain, working error and other theoretical causes, each of the double contact seal elements 10 is prevented from reciprocating toward and away the interior of the associated groove even though the element might rock about the cylinder and socket joint between the element 10 and its holder 24. Even in the presence of the abovementioned strain and error, displacement of the elements is very small. Therefore, the apex seal for the rotor R is retained.

In operation of the rotary pump illustrated, the shaft for the crank C is rotated in the direction of the arrow by any suitable external force thereby to cause the rotor to effect rotation on the crank in the direction of the arrow about the axis $O_1$ and simultaneously to effect revolution about the axis $O_0$. As previously described, the rotor effects one complete rotation during two complete revolutions in the same direction as the rotation through the action of the gearing $G_0$, $G_1$. Under these circumstances, the pair of divided operating chambers $V_1$ and $V_2$ each change their volumes once during one complete rotation of the rotor R. In other words, each chamber changes its volume from a minimum to a maximum magnitude and thence to the minimum magnitude during one complete rotation of the rotor whereupon one cycle is completed. Thus for the rotary pump having a suction or inlet port $P_1$ formed one side of the housing H and an exhaust port $P_2$ on the other side, the utilization of this change in volume of each operating chamber $V_1$ or $V_2$ leads to elimination of the necessity of providing a suction and an exhaust valve.

Figure 18:
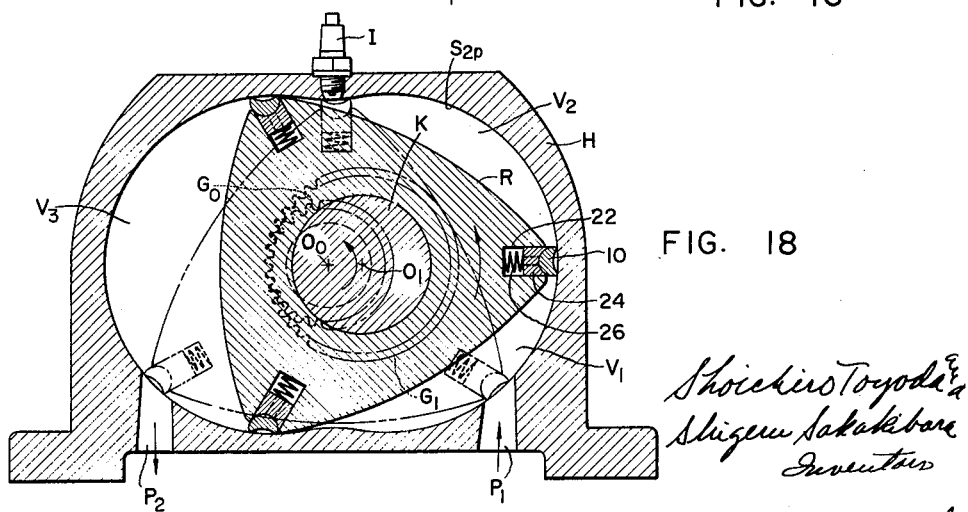

Referring now to FIG. 18, there is illustrated one embodiment according to the four cycle internal combustion engine of the invention wherein the internal cross-sectional profile of a housing follows the parallel curve $S_{2p}$ as shown in FIG. 13 and a three arc-shaped rotor rotatably disposed in the interior of the housing has its external cross-sectional profile following the inner envelope for that parallel curve $S_{2p}$ as previously described in conjunction with FIG. 13.

As shown in FIG. 18, a housing H has its internal curved surface $S_{2p}$ having its theoretical center $O_0$. The rotor R is operatively coupled to the housing H in the manner as above described in conjunction with FIG. 17. However, a double lobed curve is utilized as the basic curve to determine the profiles of the interior of the housing and rotor, a distance between the axes $O_0$ and $O_1$ is equal in magnitude to the constant $a_2$ in the equations for the double lobed epitrochoidal curve and a gear ratio between an externally and an internally toothed gear $G_0$ and $G_1$ is 2:3. Thus the rotor has a ratio of number of revolutions to rotation equal to 3:1. As shown in FIG. 18 an apex seal structure 10, 24, 26, 22 identical in construction and operation to that illustrated in FIG. 11 are operatively associated with each of three apices of the rotor.

The housing H is further provided on the lower portion as viewed in FIG. 18 with inlet port $P_1$ for introducing a fuel-and-air mixture into the interior of the housing and an exhaust port $P_2$ for exhausting the fuel waste. Disposed on the upper portion of the housing H is an ignition plug I for igniting the fuel-and-air mixture introduced into the interior of the housing. It is to be understood that the interior of the housing is closed at both ends by end walls on which the central shaft for the crank C is journalled through any suitable bearings although such construction is not illustrated in FIG. 18. A torque generated is taken out from the crank C.

The arrangement illustrated is operated in the substantially same manner as the conventional type of rotary type internal combustion engine utilizing a parallel curve for a double lobed epitrochoidal curve of similar type as the internal cross-sectional profile of the housing. Briefly three separate operating chambers $V_1$, $V_2$ and $V_3$ are confined by the internal curved surface $S_{2p}$ of the housing $H_1$, three arc-shaped portions of the rotor and both end walls of the housing. As the rotor R effects revolution and rotation in the directions of the arrows within the interior of the housing while its axis of rotation is changed, each of the operating chambers changes twice its volume from its maximum to its minimum value and thence from its minimum to its maximum value during one complete rotation of the rotor. This change in volume of the chamber is utilized to operate the engine. For example, referring to the first chamber $V_1$, a fuel-and-air mixture is being introduced through the inlet port $P_1$ into the first chamber at the position illustrated in FIG. 18. That is, the chamber $V_1$ is in its suction stroke. As the rotor $R_a$ is driven in the directions of the arrows the chamber is moved upwardly to initiate the compression stroke until its volume reaches the minimum magnitude whereupon the ignition plug I is ignited. This causes the chamber to be moved leftwards thereby to increase the volume of the chamber. Therefore, the expansion stroke is effected until the volume of the chamber reaches its maximum magnitude. At the same time the crank C is imparted a turning torque. Then as the chamber is moved downwardly its volume decreases to a minimum magnitude whereby the waste gas is exhausted from the chamber through the exhaust port $P_2$ until the exhaust stroke terminates. In this way the engine has performed the four cycle-stroke per each complete rotation of the rotor R. The second and third chambers $V_2$ and $V_3$ are operated in the same manner as just described. As previously noted, the crank C effects three complete revolutions per each complete rotation of the rotor. Therefore it will be appreciated that the crank C is imparted a rotating torque through ignition and expansion of any one of three chambers once during one complete rotation of the same.

It will be readily appreciated that the combination of the rotor and the housing as above described in conjunction with FIG. 18 is equally applicable to two cycle internal combustion engines, rotary pumps, rotary air pumps and rotary oil pumps.

Figure 19:
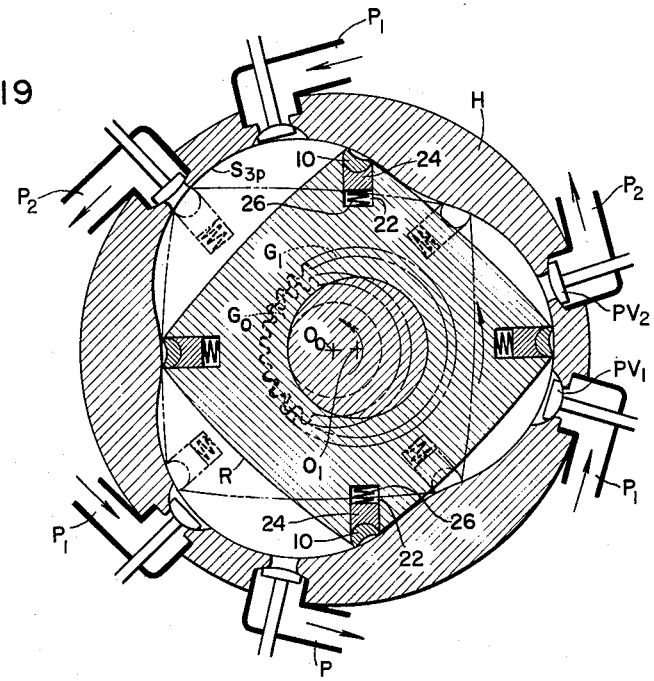

Referring now to FIG. 19, there is illustrated a rotary compressor apparatus embodying the teachings of the invention. An arrangement illustrated utilizes a triple lobed epitrochoidal curve such as shown in FIG. 3. Therefore an internal cross-section profile of a housing H is defined by a parallel curve $S_{3p}$ formed by having the outside modified curve $S_3$ (see FIG. 8) expanded outwardly by a length of $r_2$ (which is a radius of each minor arc portion 14 of a sealing element 10 as shown in FIG. 10) and an external cross-sectional profile of a rotor R is defined by an inner envelope formed of such parallel curves $S_{3p}$ and has four arc-shaped portions.

Since the arrangement illustrated is a rotary compressor three sets of suction and feed ports $P_1$ and $P_2$, operatively coupled to suction and feed valves $PV_1$ and $PV_2$ respectively. Other respects are substantially the same as in FIG. 17 except for a gear ratio of 3:4 and an eccentric distance between two axes $O_0$ and $O_1$ equal in magnitude to the constant $a_3$ in the equations for the triple lobed epitrochoidal curve and therefore the corresponding components are designated by the same reference characters and numerals.

As shown in FIG. 19 the four arc-shaped rotor R divides the interior of the housing H into four operating chambers $V_1$, $V_2$, $V_3$ and $V_4$. In operation each of the volumes of chambers rotates while moving to change three times during one complete rotation of the rotor. This change in volume of each chamber cooperates with opening and closing of the associated suction and feed valves to perform pumping function as will be readily understood.

Figure 20:
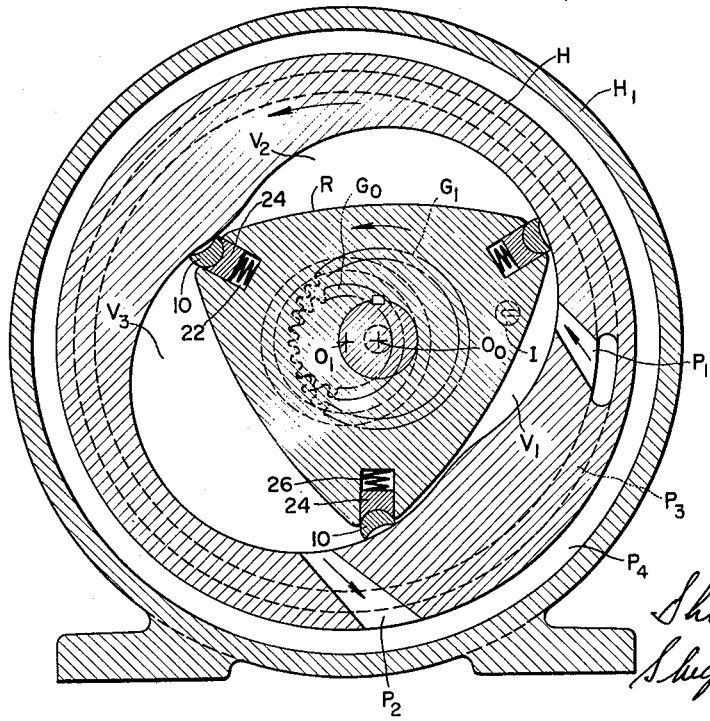

A four cycle internal combustion engine illustrated in FIG. 20 comprises a housing H and a rotor R substantially similar in configuration to those shown in FIG. 18. However, the housing H is rotatably supported at its own axis $O_1$ to an outer stationary housing $H_1$ through bearings (not shown) and the rotor R is also rotatably supported at its own axis $O_0$ to the same stationary housing through bearings (not shown) with a distance between both axes equal in magnitude to the constant $a_2$ in the equations for a double lobed epitrochoidal curve utilized. That is, the arrangement illustrated comprises no crank and will theoretically provide an engine including a fixed crank.

In the arrangement illustrated in FIG. 18, the rotor effects one complete rotation as the crank effects three complete rotations with the housing maintained stationary. Assuming that the crank is maintained stationary, the housing and the rotor are required to effect three complete rotations in the reverse direction. Therefore the housing and the rotor shown in FIG. 20 have to effect three and two complete rotations in the reverse direction respectively. To this end, an externally toothed $G_0$ gear is provided on the housing side and an internally toothed gear $G_1$ provided on the rotor side with a gear ratio equal to 2:3 as in FIG. 18.

In operation each of three operating chambers $V_1$, $V_2$ and $V_3$ defined by the internal curved surface $S_{2p}$ of the housing H and the three arc-shaped rotor R moves in position while rotating and effects a change in volume effected in two successive cycles of operation during two and three complete rotations respectively of the rotor R and the housing H. Such a change in volume is utilized to construct the arrangement as illustrated in FIG. 20. It is to be understood that this change in volume is equally applicable to rotary pumps and two cycle internal combustion engines of rotary type.

As shown in FIG. 20 the housing H is provided with an inlet and an exhaust ports $P_1$ and $P_2$ at any suitable positions. The inlet port $P_1$ extends transversely and is normally open in an annular groove $P_3$ disposed on the side wall of the stationary housing $H_1$ and communicating with an external suction pipe (not shown). The exhaust port $P_2$ extends through the wall of the rotary housing H and is open into an annular space $P_4$ formed between both housings and communicating with an external exhaust pipe (not shown). It is to be understood that an ignition plug I is suitably disposed on one end wall of the stationary housing H at its position illustrated in FIG. 20.

In operation, the operating chambers $V_1$, $V_2$ and $V_3$ vary in volume in the manner as previously described while the inlet and exhaust ports $P_1$ and $P_2$ are timely open in succession into the successive chambers for suction and exhaust purposes. More specifically, when the major diameter of the interior of the housing is located substantially in the vertical direction as viewed in FIG. 20, any one of three arc-shaped portions of the rotor is disposed substantially in the vertical direction with the result that any chamber located adjacent a position represented by the ignition plug I minimizes its volume. Therefore, the ignition plug I is disposed on the stationary housing $H_1$ at its position illustrated in FIG. 20 and adapted to be ignited for alternate one of the chambers facing the same for the purpose of effecting four cycle strokes. In this way the shaft of the rotor R is imparted a torque due to the ignition and expansion in any one of the operating chambers three times for two complete rotations of the rotor. Of course, the abovementioned torque is also transmitted to the stationary housing $H_1$ and then added to the rotor shaft through gears $G_0$ and $G_1$.

It is to be understood that the system comprising the housing and the rotor adapted to be separately rotatable about their spaced axes in the manner as above described in conjunction with FIG. 20 is equally applicable to any epitrochoidal curve other than the double lobed one.

Figure 21:
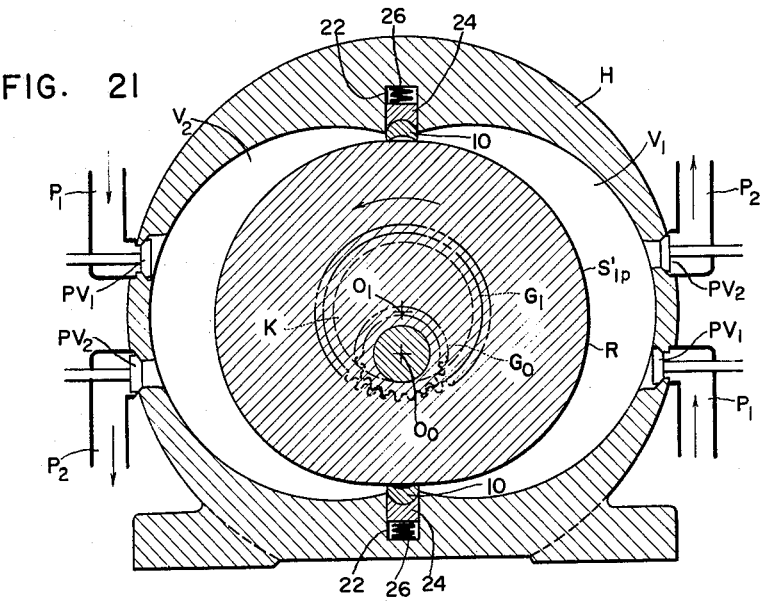

Referring now to FIG. 21, a rotary pump illustrated comprises a rotor R having its external curved surface $S'_{1p}$ defined by a parallel curve parallel contacting an inside modified curve for a single lobed epitrochoidal curve in the manner as previously described and a housing H whose internal cross-sectional profile is defined by outer envelopes formed of the parallel curves.

The rotor R is operatively coupled to the housing H in a manner similar to that previously described and adapted to effect one complete rotation in one direction for each complete revolution in the opposite direction as a crank C is rotated. To this end, an internally toothed gear $G_1$ and an externally toothed gear $G_0$ are made to have a gear ratio of 2:1. It is noted that the apex seal structures 10, 24, 26, 22 are provided on the housing side.

In the arrangement illustrated in FIG. 17, the crank C effects two complete revolutions during one complete rotation of the rotor R with the housing H maintained stationary. If it is assumed that the entire arrangement shown in FIG. 17 is rotated in the reverse direction from that shown in the same figure, the resulting relationship between rotation and revolution of the components corresponds to that in FIG. 21.

In operation, the crank C is rotated in the direction of the arrow by the action of any suitable external force thereby to rotate the rotor R in the direction of the arrow on the crank while revolving the rotor. Thereby a pair of separate operating chambers $V_1$ and $V_2$ defined by the internal surface of the housing, the external surface of the rotor and both end walls of the housing change in volume once per each complete rotation of the rotor. This change in volume is utilized to effect suction and feed of fluid through suction ports $P_1$ and feed ports $P_2$ disposed in diametrically opposed relationship on the wall of the housing and operatively coupled to suction and feed valves $PV_1$ and $PV_2$ respectively.

Figure 22:
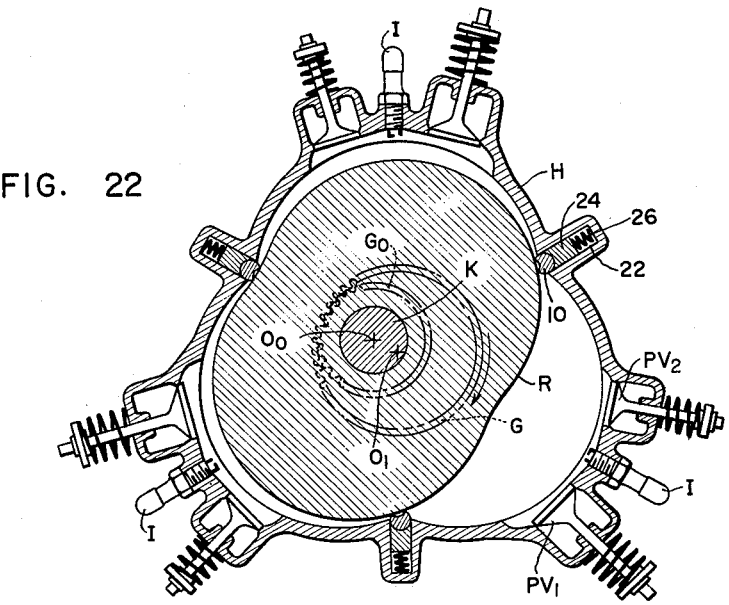

One form of four cycle internal combustion engine illustrated in FIG. 22 utilizes a double lobed epitrochoidal curve such as shown in FIG. 2 and comprises a housing H and a rotor R having their configurations defined in the manner similar to that previously described in conjunction with FIG. 21. The rotor R is adapted to effect one complete rotation about an eccentric shaft $O_0$ of a crank C in one direction during two complete revolutions thereof about its axis $O_1$ in the other direction by a mechanism similar to that previously described in FIG. 21. A distance between the axes $O_0$ and $O_1$ corresponds to the constant $a_2$ in the equations for the double lobed epitrochoidal curve utilized and a gear ratio of 2:3 is used. As in FIG. 21, apex seal structures 10, 24, 26, 20 are disposed on the housing side. The housing H is provided on the peripheral wall with three sets of ignition plugs, inlet ports and valves and exhaust ports and valve I, $P_0$, $PV_1$, $P_2$, and $PV_2$ respectively to complete the engine.

Figure 23:
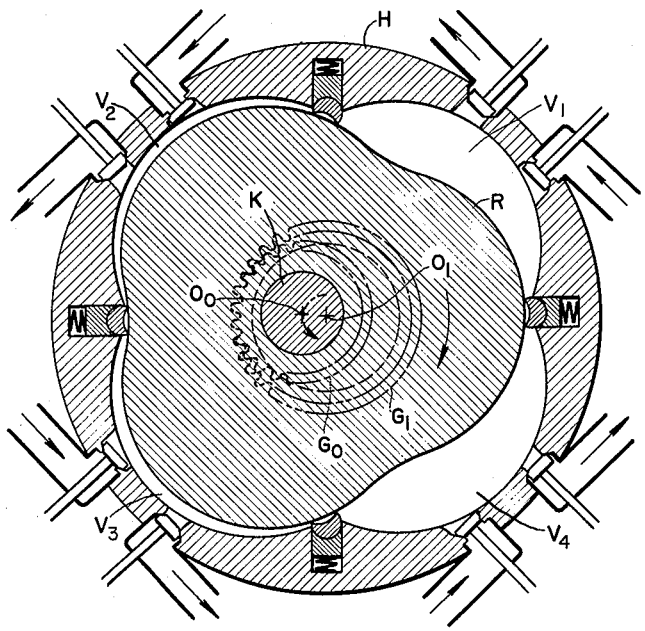

FIG. 23 illustrates a rotary pump designed and constructed on the basis of a triple lobed epitrochoidal curve according to the teachings of the invention. An arrangement illustrated comprises a housing H and a rotor R having the respective configurations defined in the manner similar to that previously described in conjunction with FIG. 21. The housing H has its internal cross-sectional profile having four arc-shaped portions and that rotor R is adapted to effect one complete rotation about an eccentric axis $O_0$ of a crank C in one direction during three complete revolutions of the same in the opposite direction. Other respects are substantially similar to those illustrated in FIG. 21 excepting that a distance between two axes $O_0$ and $O_1$ corresponds to the constant $a_3$ in the equations for the triple lobed epitrochoidal curve utilized and a gear ratio of 4:3 is used.

In operation, three operating chambers $V_1$, $V_2$, $V_3$ and $V_4$ divided by the rotor each change in volume three times during one complete rotation of the rotor. As in the previous arrangements, this change in volume is utilized for pumping purposes. It will be readily appreciated that the arrangement illustrated in FIG. 23 is equally applicable to four cycle internal combustion engines.

Figure 24:
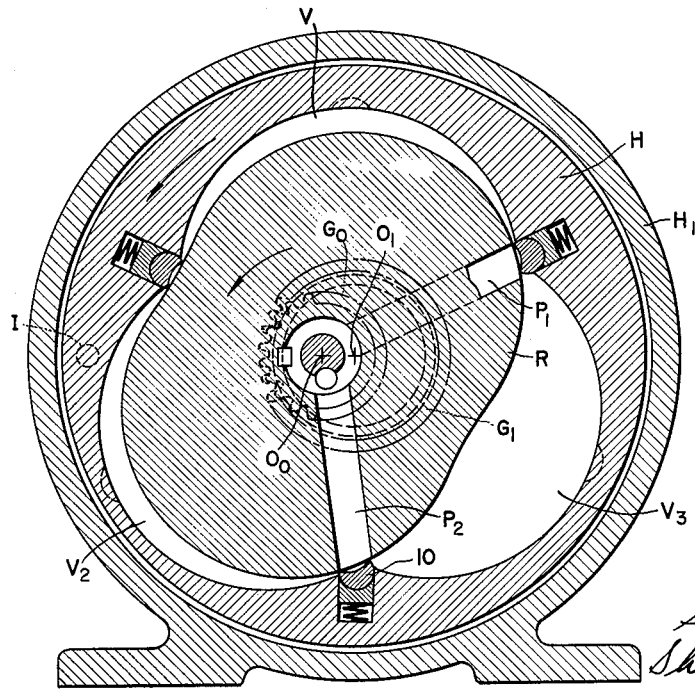

FIG. 24 illustrates a four cycle internal combustion engine embodying the teachings of the invention. As in FIG. 20, a housing H defining three operation chambers $V_1$, $V_2$, $V_3$ and $V_4$ and a rotor R are rotatably supported to an outer stationary housing $H_1$. The rotary housing H and the rotor R have their cross-sectional profiles defined in the manner similar to that previously described in conjunction with FIG. 21 and on the basis of double lobed epitrochoidal curve such as shown in FIG. 2. The rotor R is provided with radial inlet and exhaust bores $P_1$ and $P_2$ at the positions illustrated communication with the interior of the stationary housing $H_1$ through the axial hollow portion of the rotor shaft. The rotatory housing H is provided on the lefthand portion as viewed in FIG. 24 with an ignition plug I. The housing H is adapted to effect two complete rotations about its axis $O_1$ during three complete rotations of the rotor R about its axis $O_0$ in the same direction as the housing $H_{2b}$ through gearings $G_0$ and $G_1$ having a gear ratio of 2:3. Each of operating chambers $V_1$, $V_2$ and $V_3$ defined by the inner and outer surfaces of the housing H and the rotor R and both end walls of the housing changes in volume twice during two complete rotations of the rotor.

With the arrangement illustrated it will be appreciated that as the major axis of the rotor R assumes substantially the vertical direction, any one of operating chambers $V_1$, $V_2$ or $V_3$ reaches the righthand side as viewed in FIG. 24 of the interior of the rotary housing H and becomes maximum in volume. On the other hand, when the major axis of the rotor assumes substantially the horizontal direction any one of these chambers reaches the lefthand side of the interior of the housing and becomes minimum in volume. Therefore each chamber will have a chance that it becomes maximum or minimum in volume on the righthand or lefthand side of the interior of the rotary housing respectively six times during three complete rotations of the rotor. In other words, the chambers will have successively such a chance twice during this rotational movement of the rotor.

On the basis of the rotation of the rotatory housing H, each of the operating chambers $V_1$, $V_2$ and $V_3$ has the following strokes. When any one of the arc-shaped concave surface portion of the housing H is positioned on the lefthand side as viewed in FIG. 24 any chamber associated with that surface portion initiates its suction stroke and continues the same stroke during rotational movement of the housing through an angle of 180 degrees. Then that chamber has its compression stroke during the succeeding rotational movement of the housing through a further angle of 180 degrees and at the end of the compression stroke the chamber reaches the lefthand side of the engine as viewed in FIG. 24 whereupon the ignition plug I is ignited. A period of time during which the housing H is further rotated through an angle of 180 degree provides the expansion stroke for the chamber following by the exhaust stroke effected over a succeeding angle of 180 degrees through which the inner housing is rotated. Thus the chamber completes the cycle. For the remaining chambers, the operating strokes as above described are repeated in the named order at the same positions as in the first-mentioned chamber.

It is to be understood that the resulting torque is taken out from the rotor with a torque provided by the rotatory housing being additionally applied to the rotor shaft through gears $G_0$ and $G_1$.

A seal element having the basic construction illustrated typically in FIG. 10 may be variously modified. For example, seal elements illustrated in FIGS. 25 through 28 wherein the same reference numerals designate the components corresponding to those illustrated in FIG. 10 can be effectively used with the machines as previously described.

Figure 25:
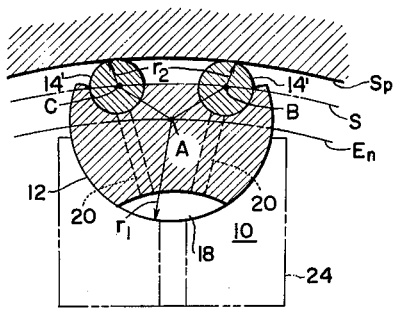
FIGS. 25 through 29 show sections of modifications of the seal element constructed in accordance with the teachings of the invention.

In FIG. 25, a seal element 10 includes a pair of rollers 14' rotatably disposed in a pair of grooves formed in the body thereof and complementary in configuration to the rollers, and an oil passage 20 extending through the body from a recess 18 to the associated roller. Other respects are the same as in the element 10 shown in FIG. 10.

More specifically, the center A of the body about which the major arc portion 12 has its radius of $r_1$ forms an isosceles triangle $\triangle$ ABC with a pair of centers B and C to which coincide the centers of the rollers 14' having a common radius of $r_2$. With the seal elements assembled in the associated pump or engine, the center A has passed therethrough a curve $E_n$ representative of any desired n-ple lobed epitrochoidal curve on the bases of which the internal and external curved surfaces of the housing and rotor are designed and constructed, a curve S modified from the epitrochoidal curve passes through the vertices B and C for the base of the triangle and a curve $S_p$ parallel to the modified curve S or prepared by uniformly expanding or contracting the modified curve S by a length of $r_2$ contacts the two rollers 14'.

It is to be understood that the seal element 10 is held by the associated holder 24 for rocking movement about the point A.

Figure 26:
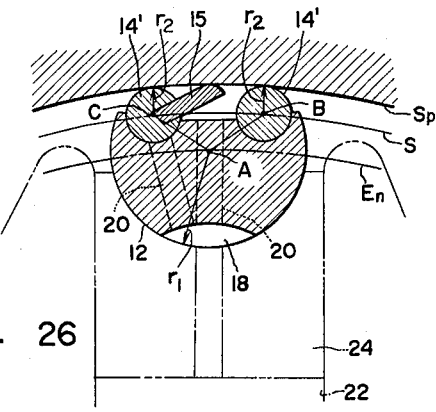

An arrangement illustrated in FIG. 26 is substantially similar to that shown in FIG. 25 excepting that, one of the rollers in this case the lefthand roller 14' is provided with a vane 15 adapted to contact the mating surface of the engine, pump or the like and that one of oil passages does not reach the other roller 14' but is open between the two rollers. The seal element is adapted to be rockably held by a compensating holder 24.

When the seal element is moved in the direction of the arrow the roller 14' without the vane 15 is allowed to be rolled along the mating surface. However, the roller 14' with the vane is allowed only to slide along the mating surface after somewhat rocking movement during relative movement in the direction of the arrow. With the arrangement illustrated it will be appreciated that the seal element acts as a three contact seal element resulting in an increase in seal effect as compared with FIGS. 10 and 25. It is to be noted that the righthand roller 14' is not necessarily rollable and may be rigidly secured to the body.

Figure 27:
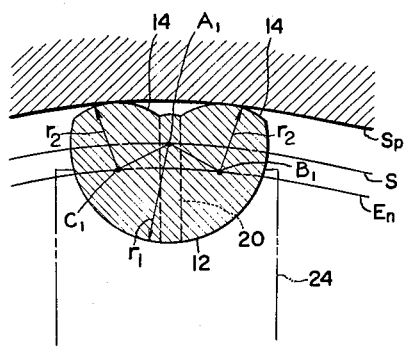

FIG. 27 illustrates a seal element substantially identical to that shown in FIG. 10 excepting that it is designed and constructed upon the basis of an isosceles triangle inverted from that shown in FIGS. 10, 25 or 26. Therefore, like reference characters have been employed to designate the corresponding components.

An isosceles triangles △ ABC illustrated in FIG. 27 may be said to correspond to one having a vertical angle A (which is formed of the equal sides) exceeding 180 degrees and therefore may be identical to the previously described isosceles triangle although it might not be necessarily identical to the latter. However, it is to be noted in FIG. 27 that the relationship between the vertices of the triangle and the abovementioned curves are the same as that in the cases as previously described in conjunction with FIG. 25.

While FIG. 27 illustrates a modified curve S lying on that side of an $n$-ple lobed epitrochoidal curve $E_n$ near the compensating holder 24 and a parallel curve $S_p$ lying on the opposite side of the curve $E_n$ the parallel curve $S_p$ may lie on the reverse side from that shown and intersect the curve $E_n$ dependent upon the magnitude of radius $r_2$. Alternatively the curve $S_p$ may lie between the curves $E_n$ and S. Therefore it will be appreciated that with the seal element as shown in FIG. 27, the modified curve used with any of the arrangements illustrated in FIGS. 17–24 may lie on the side of the epitrochoidal curve $E_n$ reverse from that shown. For example, if a single lobed epitrochoidal curve $E_1$ is utilized then an inner modified curve $S'_1$ may be used in place of an outer modified curve and contracted or expanded and vice versa.

Figure 28:
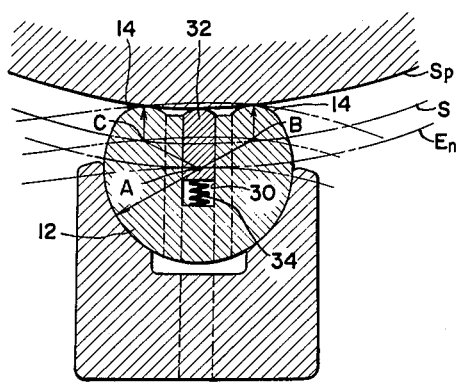

FIG. 28 illustrates another form of seal element wherein a single contact seal piece is centrally provided on a seal element such as shown in FIG. 10. As shown in FIG. 28, a body 12 of a seal element is provided between a pair of round contact portions 14 with a radial groove 30 into which a rectangular sheet-like seal piece 32 having an extremity of arc-shaped cross-section is disposed. A spring 34 is disposed in the groove 10 to tend to normally force the seal piece 32 outwardly. Thus the arrangement provides actually a triple contact seal element.

With the arrangement illustrated, the position of the vertices A, B and C of the isosceles triangle relative to the associated curve $E_n$ and S is the same as those previously described in conjunction with FIG. 25. Thus the contact portions 14 continuously slide along a surface defined by the parallel curve $S_p$ while contacting the latter. However, the seal piece 32 may be moved toward and away from the surface because of variation in curvature of the curve $S_p$. Therefore, in order to improve the seal effect the seal piece 32 must be permitted to be moved within limits as narrow as possible. It has been found that the piece 32 was permitted to be moved less and 0.1 mm. with the satisfactory result. Due to the ambient pressure relatively low, the spring 34 may have its spring constant relatively low with the piece 32 having relatively low initial pressure applied thereto. If desired, a plurality of intermediate seal pieces 32 may be used between the two contact portions 14.

Figure 29:
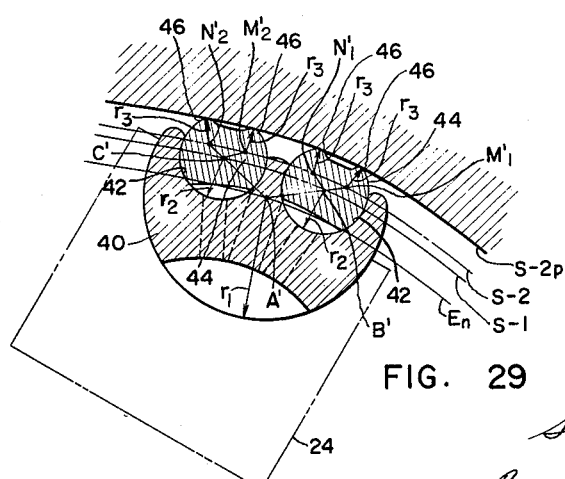

FIG. 29 illustrates a quadruple contact seal element constructed in accordance with the teachings of the invention. An arrangement illustrated includes the main body 40 identical to the seal element as shown in FIG. 25 excepting that the two rollers are omitted. Thus a pair of grooves 42 is formed in the body having a radius of $r_2$. Then a pair of smaller seal portions 44 identical to the seal elements illustrated in FIG. 10 are rockably disposed in the grooves 42 respectively. The seal portions 44 are of the same construction and associated with a pair of isosceles triangles $\Delta B'_1 M'_1 N'_1$ and $\Delta C_1 M'_2 N'_2$ respectively. Four arc-shaped portions 46 have a common radius $r_3$ about the vertices $M'_1$, $N'_1$, $M'_2$ and $N'_2$ and are adapted to continuously slide along the mating surface $S-2_p$ while contacting the latter thereby to provide hermetic seal.

It is to be understood that in order to supply a lubricant to the rockable portions, oiling passages are provided as illustrated at dotted line in FIG. 29.

It is essential in view of the operational standpoint that, in order to permit the operating portions 40 and 44 to be rockable while preventing the compensating holder 24 from reciprocating, the mating surface $S-2_p$ should be properly prepared. To this end, the isosceles triangle $\Delta A'B'C'$ upon the basis of which the first portion 40 is constructed has its vertex $A'$ lying on an $n$-ple lobed epitrochoidal curve $E_n$ and vertices $B'$ and $C'$ for its base lying on the modifiedl curve $S-1$. Simultaneously a pair of isosceles triangles $\Delta B'M'_1N'_1$ and $\Delta C'M'_2N'_2$ for the two second portions 44 have the respective vertices $B'$ and $C'$ lying on the modified curve $S-1$ and the respective vertices $M'_1$, $N'_1$, $M'_2$ and $N'_2$ for the bases lying on a second modified curve $S-2$ which is required to be obtained. Once such curve $S-2$ has been obtained, the same can be uniformly expanded or contracted by a length of $r_3$ to provide a parallel curve $S-2_p$. Then the parallel curve is utilized to determine the internal or external curved surface respectively of a housing or rotor as in the previously described embodiments.

Figure 30:
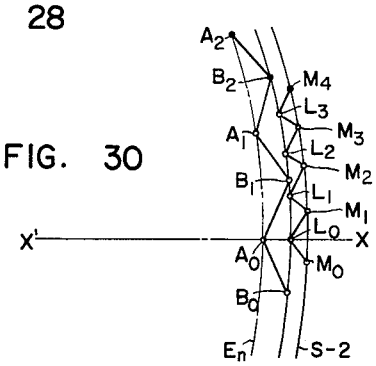
FIG. 30 is a view similar to FIGS. 4 through 9, and useful when the seal element as illustrated in FIG. 29 is used with a rotary machine.

A manner in which the abovementioned curve $S-2$ is obtained will now be described in conjunction with FIG. 30. In the same figure, any $n$-ple lobed epitrochoidal curve is designated at curve $E_n$ and an isosceles triangle $A_0B_0B_1$ is initially disposed outside the curve $E_n$ so that its vertex for the equal sides is positioned at the intersection of the curve $E_n$ and with the $x$ axis of the coordinate system involved with the base perpendicular to the $x$ axis as in FIGS. 4 through 9. If desired, the triangle may be disposed on the $y$ axis or $z$ axis. It is assumed that the triangle is identical to the isosceles triangle $\Delta A'B'C'$ as shown in FIG. 29 upon the basis of which the seal portion 20 is designed and constructed. Then the triangle is moved along the curve $E_n$ to prepare a modified curve $S-1$ passing or nearly passing through the now known points $B_0$, $B_1$, $B_2$, . . . in the manner as previously described in conjunction with FIG. 4. It is to be understood that such a modified curve may be prepared inside the curve $E_n$, if desired.

Then another isosceles triangle $\Delta L_0N_1M_1$ identical to each of the isosceles triangle $\Delta B'M'N'_1$ or $\Delta C'M'_2N'_2$ is initially disposed with respect to the curve $S-1$ thus prepared in the same manner as above described for the isosceles triangle $\Delta A_4B_4B_1$. The isosceles triangle $\Delta L_0M_0N_1$ is again moved along the modified curve $S-1$ to prepare a second modified curve passing or near passing through the now known points $M_0$, $M_1$, $M'_2$, $M'_3$, $M'_4$ . . . in the same manner as previously described in conjunction with FIG. 4. The curve thus prepared provide the requested curve $S-2$ which has been described for FIG. 29 and through which the vertices $M'_1$, $N'_1$, $M'_2$ and $N'_2$ of the isosceles triangles for the two second portions pass theoretically.

It will be readily appreciated that the arrangement illustrated in FIG. 26 or 27 may be incorporated into that illustrated in FIG. 29 to provide an apex seal structure including more than four line contacts with the mating surface.

From the foregoing it will be appreciated that the invention has provided a new and improved apex seal structure which can solve the seal problem previously encountered in designing and constructing rotary machines such as internal combustion engines and rotary pump utilizing any epitrochoidal curves or curves parallel thereto. The seal structure disclosed by the invention is based upon an isosceles triangle and including basically a pair of semi-circular ridges having a common radius of $r_2$, disposed about both vertex for the base of the triangle and adapted to slide along the mating surface while the same is permitted to rock about the vertex formed of the equal sides of the triangle and adapted to move on the epitrochoidal curve involved.

In order to maximize the seal effect of the present seal structure, the cross-sectional profile of the mating surface along which the seal structure slides while rocking follows a parallel curve prepared by first moving an isosceles triangle identical to that for the seal structure, along a selected $n$-ple lobed epitrochoidal curve so as to move the vertex formed of equal sides of the triangle along the epitrochoidal curve while suitably rocking the triangle about the vertex to cause the vertices for its base to depict a modified curve on the outside or inside of the epitrochoidal curve and then displacing the modified curve in parallel relationship outwardly or inwardly thereof by a length equal to $r_2$ as above described. In this way, the seal between the seal structure and the mating surface along which the same slides while rocking can be maintained compared favorably with the conventional type of reciprocating machines.

Even if the housing and/or the rotor involved would have been deformed due to the error of finishing, and wear, thermal strains and the like occurring in operation, the seal structure can freely move toward and away from the mating surface to automatically compensate for such deformations as long as the associated compensating holder and biassing spring are formed properly. In addition, any suitable lubricant can be readily supplied in the necessary and sufficient amount to the relatively sliding and relatively rocking portions of the seal structure thereby to effectively prevent such portions from excessively overheating and increasing in friction with the result that the chattering phenomena and wear greatly decrease. Even if there is somewhat a tendency to chatter the seal structure, a plurality of contacting ridges on the same ensure the seal effect unless the structure would jump to an extent that all the ridges are simultaneously separated away from the mating surface. Even in the latter case, spaces confined by some of the circular ridges and the adjacent portion of the mating surface will exhibit the labyrinth effect which in turn prevents the performance of the machine from being impaired in high speed operation. Also the seal structure has a sufficiently large area on which the same is put in contact with the mating surface as compared with the prior art type machines. The cooperates with the oil-film and labyrinth effects to effectively prevent the performance of the machine from decreasing in the low speed operation.

The invention is also advantageous in that the rotary machines is minimized in weight and space occupied thereby as compared with the conventional type of reciprocating machine.

While the invention has been illustrated and described in conjunction with certain preferred embodiments thereof it is to be understood that various changes in the detail of construction and the combination and arrangement of parts without departing from the spirit and scope of the invention. For example, any embodiment of the invention previously described as an internal combustion engine or a rotary pump may be readily converted into a rotary machine other than that shown. Also any two or more of the seal structures illustrated may be combined into another seal structure.

What we claim is:

1. In a rotary machine comprising a rotor member, a housing member including therein a plurality of chambers for compressing a fluid introduced therein, said rotor member being disposed in the interior of said housing member to define said plurality of chambers with said housing and capable of being driven eccentrically to the central axis of said interior of said housing, said housing member and said rotor member having respectively an internal cross-sectional profile and an external cross-sectional profile determined on the basis of an $n$-ple epitrochoidal curve, and an apex seal structure between any pair of adjacent chambers for hermetically sealing therebetween, the combination of said seal structure having a profile based upon an isosceles triangle substantially smaller in dimension than the radius vector of said $n$-ple lobed epitrochoidal curve, and including at least a pair of longitudinal ridge portions; said housing member having the internal cross-sectional profile following a curve prepared by moving an isosceles triangle identical to said isosceles triangle for said seal structure, along said epitrochoidal curve in such a manner that two vertices for the base of the moving triangle move along a modified curve spaced in parallel from said epitrochoidal curve a predetermined minute length while the remaining vertex depicts said epitrochoidal curve to determine said modified curve, and radially displacing said modified curve in parallel thereto by a length equal to a distance between the extremity of said ridge portion of said seal structure and the base of the triangle for said seal structure; and said rotor member having the external cross-sectional profile determined by an envelope formed of said curve determining said internal cross-sectional profile of said housing member; said seal structure being disposed at each apex of the rotor member to hermetically contact the housing member.

2. In a rotary machine comprising a rotor member, a housing member including therein a plurality of chambers for compressing a fluid introduced therein, said rotor member being disposed in the interior of said housing member to define said plurality of chambers with said housing and capable of being driven eccentrically to the central axis of said interior of said housing, said housing member and said rotor member having respectively an internal cross-sectional profile and an external cross-sectional profile determined on the basis of an $n$-ple epitrochoidal curve and an apex seal structure between any pair of adjacent chambers for hermetically sealing therebetween, the combination of said seal structure having a profile based upon an isosceles triangle substantially smaller in dimension than the radius vector of said $n$-ple lobed epitrochoidal curve, and including at least a pair of longitudinal ridge portions; said rotor member having the external cross-sectional profile following a curve prepared by moving an isosceles triangle identical to said isosceles triangle for said seal structure, along said epitrochoidal curve in such a manner that two vertices for the base of the moving triangle move along a modified curve spaced in parallel from said epitrochoidal curve a predetermined minute length while the remaining vertex depicts said epitrochoidal curve to determine said modified curve, and radially displacing said modified curve in parallel thereto by a length equal to a distance between the extremity of said ridge portion of said seal structure and the base of the triangle for said seal structure; and said housing member having the internal cross-sectional profile determined by an envelope formed of said curve determining said external cross-sectional profile of said rotor member; said seal structure being disposed at each apex of the housing to hermetically contact the rotor member.

3. A rotary machine as claimed in claim 1, wherein said modified curve is depicted outside said $n$-ple epitrochoidal curve, said external cross-sectional profile of said rotor member being determined by an inner envelope formed of the curve determining the internal cross-sectional profile of the said housing member, and said seal structure is resiliently mounted at each of the apices of said rotor member to contact on said plurality of longitudinal ridge portions with the internal curved surface of said housing.

4. A rotary machine as claimed in claim 2, wherein said modified curve is depicted inside said *n*-ple epitrochoidal curve, said internal cross-sectional profile of said housing member being determined by an outer envelope formed of the curve determining the external cross-sectional profile of the said rotor member, and said seal structure is resiliently mounted at each of the apices on the internal curved surface of the housing member of said rotor member to contact on said plurality of longitudinal ridge portions with the external curved surface of said rotor member.

5. A rotor machine as claimed in claim 1, wherein at least the outermost ridge portion on said seal structure includes an arc-shaped portion having a radius equal to length by which said modified curve is radially displaced in parallel thereto and having the center at the vertex for the base of said isosceles triangle of the same.

6. A rotary machine as claimed in claim 2, wherein at least the outermost ridge portion on said seal structure includes an arc-shaped portion having a radius equal to length by which said modified curve is radially displaced in parallel thereto and having the center at the vertex for the base of said isosceles triangle for the same.

7. A rotary machine as claimed in claim 1, wherein said seal structure is mounted on the associated member to be rockable about the vertex formed of the equal sides of said isosceles triangle for the same.

8. A rotary machine as claimed in claim 2, wherein said sail structure is mounted on the associated member to be rockable about the vertex formed on the equal sides of said isosceles triangle for the same.

9. A rotary machine as claimed in claim 1, wherein said seal structure is provided with a plurality of passages through which a lubricant is supplied to the contacting surface portions thereof.

10. A rotary machine as claimed in claim 2, wherein said seal structure is provided with a plurality of passages through which a lubricant is supplied to the contacting surface portions thereof.

11. A rotary machine as claimed in claim 1, wherein said seal structure is resiliently disposed on an associated member so as to be movable toward and away from the other member.

12. A rotary machine as claimed in claim 2, wherein said seal structure is resiliently disposed on an associated member so as to be movable toward and away from the other member.

13. A rotary machine as claimed in claim 1, wherein at least the outermost ridge portion on said seal structure is composed of a roller rotatably disposed in the associated groove formed on the surface of said seal structure.

14. A rotary machine as claimed in claim 2, wherein at least the outermost ridge portion on said seal structure is composed of a roller rotatably disposed in the associated groove formed on the surface of said seal structure.

15. A rotary machine as claimed in claim 1, wherein at least the outermost ridge portion on said seal structure is composed of a roller rotatably disposed in the associated groove formed on the surface of said seal structure and at least one of said rollers includes a sheet like vane for exhibiting the seal effect.

16. A rotary machine as claimed in claim 2, wherein at least the outermost ridge portion on said seal structure is composed of a roller rotatably disposed in the associated groove formed on the surface of said seal structure and at least one of said rollers includes a sheet like vane for exhibiting the seal effect.

17. A rotary machine as claimed in claim 1, wherein said seal structure includes at least one thin strip resiliently disposed between at least two outermost ridge portions thereon so as to be movable forward and away from the mating member.

18. A rotary machine as claimed in claim 2, wherein said seal structure includes at least one thin strip resiliently disposed at least two outermost ridge portions thereon so as to be movable forward and away from the mating member.

19. A rotary machine as claimed in claim 1, wherein said seal structure includes the main body rockably supported on the associated member and comprising at least two longitudinal grooves on that surface portion of the main body facing the other member and a contact member rockably disposed in each of said grooves and comprising at least two longitudinal ridge portions adapted to contact the other member.

20. A rotary member as claimed in claim 2, wherein said seal structure includes the main body rockably supported on the associated member and comprising at least two longitudinal grooves on that surface portion of the main body facing the other member and a contact member rockably disposed in each of said grooves and comprising at least two longitudinal ridge portions adapted to contact the other member.

21. A rotary machine comprising an outer stationary housing member of circular cross-section, and said housing member, said rotor member and said seal structure as specified in claim 1, said last-mentioned housing member being rotatably mounted at its own axis to said outer stationary housing member, said rotor member being also mounted at its own axis to said outer housing member.

22. A rotary machine comprising an outer stationary housing member of circular cross-section, and said housing member, said rotor member and said seal structure as specified in claim 2, said last-mentioned housing member being rotatably mounted at its own axis to said outer stationary housing member, said rotor member being also mounted at its own axis to said outer housing member.

References Cited by the Examiner

UNITED STATES PATENTS

| | | | |
|---|---|---|---|
| 748,348 | 12/1903 | Cooley | 123—8 |
| 2,382,259 | 8/1945 | Rohr | 123—8 |
| 3,034,484 | 5/1962 | Stefancin | 123—8 |
| 3,103,920 | 9/1963 | Georges | 123—8 |
| 3,120,921 | 2/1964 | Hovorka | 230—145 |
| 3,142,440 | 7/1964 | Schagg | 230—145 |
| 3,186,384 | 6/1965 | Fuhrmann | 123—8 |
| 3,194,489 | 7/1965 | Frenzel | 230—145 |

FOREIGN PATENTS

| | | |
|---|---|---|
| 1,297,241 | 5/1962 | France. |
| 967,098 | 8/1964 | Great Britain. |

DONLEY J. STOCKING, *Primary Examiner.*